(12) United States Patent
Vandersluis

(10) Patent No.: US 7,165,073 B2
(45) Date of Patent: Jan. 16, 2007

(54) DYNAMIC, HIERARCHICAL DATA EXCHANGE SYSTEM

(75) Inventor: Kirstan Anderson Vandersluis, Colorado Springs, CO (US)

(73) Assignee: X-Aware, Inc, Colorado Springs, CO (US)

( * ) Notice: Subject to any disclaimer, the term of this patent is extended or adjusted under 35 U.S.C. 154(b) by 318 days.

(21) Appl. No.: 10/011,022

(22) Filed: Nov. 13, 2001

(65) Prior Publication Data

US 2002/0143774 A1  Oct. 3, 2002

Related U.S. Application Data

(63) Continuation of application No. 09/264,101, filed on Mar. 8, 1999, now Pat. No. 6,356,920.

(60) Provisional application No. 60/077,259, filed on Mar. 9, 1998.

(51) Int. Cl.
*G06F 17/00* (2006.01)

(52) U.S. Cl. .............................. 707/102; 707/3; 707/101

(58) Field of Classification Search ............... 707/1–10, 707/100, 102, 101; 702/100–104.1; 716/500.1–516; 715/513–516

See application file for complete search history.

(56) References Cited

U.S. PATENT DOCUMENTS 6,898,761 B1 * 5/2005 Johnson ........................ 715/513

OTHER PUBLICATIONS www.heise.de./ix.artikel/E/1997/06/106.*
hyper.sunjapan.com/cn/~hz/win32/styles3.*
http://www.xmlfiles.com/dom/dom_access.asp.*

Requirements engineering process improvement based on an information model Doerr, J.; Paech, B.; Koehler, M.; Requirements Engineering Conference, 2004. Proceedings. 12th IEEE International 2004 pp. 70-79.*

Develop an intelligent equipment maintenance system using cyber-enabled JESS technology Yin-Ho Hao; Trappey, A.J.C.; Ku, C.C.; Lin, G.Y.P.; Ho, P.-S.; Hung, B.; Mechatronics, 2005. ICM '05. IEEE International Conference on Jul. 10-12 2005 pp. 927-932.*

On rethinking organizational document genres for electronic document management Tyrvainen, P.; Paivarinta, T.; System Sciences, 1999. HICSS-32. Proceedings of the 32nd Annual Hawaii International Conference on vol. Track2, Jan. 5-8 1999 pp. 10 pp.*

* cited by examiner

*Primary Examiner*—David Jung
(74) *Attorney, Agent, or Firm*—Dale B. Halling

(57) ABSTRACT

A computer system provides the ability to construct and edit a Data Definition File (DDF) containing hierarchically related elements of data, some of which are dynamic in that they must execute in order to produce or retrieve data. A client computer system having knowledge of a DDF appropriate for its uses sends a request to a server, which contains or can retrieve the DDF requested by the client. The request contains parameters used by the server to customize the resulting keyed data file for the client's purposes. Upon receipt of the request, the server copies the DDF into a coupled memory, performs requested parameter substitutions, and executes dynamic elements to produce resulting data elements. The process is repeated recursively for all elements of the hierarchical structure, until no dynamic elements remain, then the resulting keyed data file is returned to the client for its uses. Data elements may be derived from a plurality of sources, and these sources may be combined and manipulated using a plurality of data operations, including relational algebra or structured query language, enabling joins and merges between multiple sources and formats. An Authoring System is provided which assists in the construction and validation of DDFs.

13 Claims, 28 Drawing Sheets

System Parameter File page 1

```
1    <?XML VERSION="1.0"?>
2    <GENERAL>
3      <DOMAINS>
4        <DOMAIN NAME="XML">
5          <_STYLE KEY="ELEM"
6                 LABEL="Element"><%T%A>%V%C</%T></_STYLE>
7          <_STYLE KEY="PI"
8                 LABEL="Processing Instruction"><?%T%V%A?></_STYLE>
9          <_STYLE KEY="COMMENT"
10                LABEL="Comment"><!-- %V --></_STYLE>
11         <_STYLE KEY="TEXT"
12                LABEL="Text">%V</_STYLE>
13         <_STYLE KEY="CDATA"
14                LABEL="CDATA"><![CDATA[%V]]></_STYLE>
15         <EMPTY EMPTY_STYLES="ELEM"><%T%A/></EMPTY>
16         <HEADER>
17            <?xml version="1.0"?></HEADER>
18         <EXTENSION SYSTEM="c:\dev\agentview\Release\AgentView"
19                LABEL="View"/></DOMAIN>
20       <DOMAIN NAME="Key-Value">
21         <_STYLE KEY="ELEM"
22                LABEL="Element">%T="%V"%C</_STYLE>
23         <HEADER>
24            <DOCTYPE /></HEADER></DOMAIN></DOMAINS>
25     <EXEC_TYPES>
26       <EXEC_TYPE KEY="SQL"
27              LABEL="SQL"/>
28       <EXEC_TYPE KEY="ADO"
29              LABEL="ADO"/>
30       <EXEC_TYPE KEY="SHELL"
31              LABEL="Shell"/>
32       <EXEC_TYPE KEY="JOIN"
33              LABEL="Join"/></EXEC_TYPES></GENERAL>
34   <DEFINITIONS>
35     <DEFAULT_OUTPUT_FONT_SIZE>24</DEFAULT_OUTPUT_FONT_SIZE>
36     <DEFAULT_OUTPUT_FONT>Courier New</DEFAULT_OUTPUT_FONT>
37     <ATTR_COL_LABEL_SEP>|</ATTR_COL_LABEL_SEP>
38     <ATTR_EXEC>_EXEC</ATTR_EXEC>
39     <SPLIT_HORIZ>1</SPLIT_HORIZ>
40     <NORMALIZE_NAME_REPLACE_CHARS> ./$</NORMALIZE_NAME_REPLACE_CHARS>
41     <NORMALIZE_NAME_MAKE_UPPER>0</NORMALIZE_NAME_MAKE_UPPER>
42     <XML_CHAR_MAP><=[>=]</XML_CHAR_MAP>
43     <TREE_VIEW_FORMAT>Type %T, Attrs: %A, Value=%V</TREE_VIEW_FORMAT></DEFINITIONS>
44   <VOCABULARIES>
45     <VOCAB KEY="ALL"
46            LABEL="All">
47       <attribute name="ID"/>
48       <attribute name="_JOIN_KEY"/>
49       <attribute name="_JOIN_LABEL"/>
50       <attribute values="Outer Inner"
51              presence="IMPLIED"
52              atttype="ENUMERATION"
53              name="_JOIN_TYPE"
54              default="Outer"/>
55       <attribute name="_CASE"/>
56       <attribute name="_SWITCH"/>
57       <attribute name="_SORT_BY"/>
58       <attribute values="YES NO"
59              presence="IMPLIED"
60              atttype="ENUMERATION"
61              name="_CHILDREN_THREADS"
62              default="YES"/>
63       <attribute values="YES NO"
64              presence="IMPLIED"
65              atttype="ENUMERATION"
66              name="_SKIP"
67              default="YES"/>
68       <attribute values="YES NO"
69              presence="IMPLIED"
70              atttype="ENUMERATION"
71              name="_HIDE_VALUE"
```

FIG. 5

System Parameter File page 2

```
 72            default="YES"/>
 73         <attribute values="DAO ODBC ADO XML XDF"
 74            presence="IMPLIED"
 75            atttype="ENUMERATION"
 76            name="_DBTYPE"
 77            default="ODBC"/>
 78         <attribute name="_DBID"/>
 79         <attribute values="YES NO XML"
 80            presence="IMPLIED"
 81            atttype="ENUMERATION"
 82            name="_PARSE"
 83            default="YES"/>
 84         <attribute name="_IMPORT"/>
 85         <attribute name="_MAX_ROWS"/>
 86         <attribute values="XML ITD XDF TEXT"
 87            presence="IMPLIED"
 88            atttype="ENUMERATION"
 89            name="_IMPORT_TYPE"
 90            default="XML"/>
 91         <elementType id="BELLEVUE">
 92            <any/></elementType>
 93         <elementType id="REDMOND">
 94            <any/></elementType>
 95         <elementType id="SEATTLE">
 96            <any/></elementType>
 97         <elementType id="FORSALE">
 98            <any/></elementType>
 99         <elementType id="DBDEFINITION">
100            <string/></elementType>
101         <elementType id="DBJOIN">
102            <any/></elementType>
103         <elementType id="INPUT">
104            <string/></elementType>
105         <elementType id="PROBLEM">
106            <any/></elementType>
107         <elementType id="GENERAL">
108            <any/></elementType>
109         <elementType id="CUSTOMER">
110            <any/></elementType>
111         <elementType id="PROPERTY">
112            <any/></elementType>
113         <elementType id="CONTACT">
114            <any/></elementType>
115         <elementType id="COMPONENT">
116            <any/></elementType>
117         <elementType id="AgentLogout">
118            <any/></elementType>
119         <elementType id="AgentReady">
120            <any/></elementType>
121         <elementType id="AgentNotReady">
122            <any/></elementType>
123         <elementType id="AgentNotBusy">
124            <any/></elementType>
125         <elementType id="Established">
126            <any/></elementType>
127         <elementType id="CallInbound">
128            <any/></elementType>
129         <elementType id="CallOutbound">
130            <any/></elementType>
131         <elementType id="CallWork">
132            <any/></elementType>
133         <elementType id="Released">
134            <any/></elementType>
135         <elementType id="CallHold">
136            <any/></elementType>
137         <ELEMENTS>
138            <DBDEFINITION ICON_INDEX="142"
139                LABEL="Database"/>
140            <INPUT ICON_INDEX="143"
141                LABEL="Input Parameter"/></ELEMENTS></VOCAB>
142      <VOCAB content="CLOSED"
```

FIG. 5

System Parameter File page 3

```
143          KEY="PROB"
144          LABEL="Problem Log">
145       <attribute name="_JOIN_KEY"/>
146       <attribute name="_JOIN_LABEL"/>
147       <attribute values="Outer Inner"
148           presence="IMPLIED"
149           atttype="ENUMERATION"
150           name="_JOIN_TYPE"
151           default="Outer"/>
152       <attribute name="_CASE"/>
153       <attribute name="_SWITCH"/>
154       <attribute name="_SORT_BY"/>
155       <attribute values="YES NO"
156           presence="IMPLIED"
157           atttype="ENUMERATION"
158           name="_SKIP"
159           default="YES"/>
160       <attribute values="YES NO"
161           presence="IMPLIED"
162           atttype="ENUMERATION"
163           name="_HIDE_VALUE"
164           default="YES"/>
165       <elementType id="DBDEFINITION">
166          <string/></elementType>
167       <elementType id="INPUT">
168          <string/></elementType>
169       <elementType id="PROBLEM">
170          <any/></elementType>
171       <elementType id="LOGOUT">
172          <any/></elementType>
173       <elementType id="READY">
174          <any/></elementType>
175       <elementType id="NOTBUSY">
176          <any/></elementType>
177       <elementType id="NOTREADY">
178          <any/></elementType>
179       <ELEMENTS>
180          <DBDEFINITION ICON_INDEX="142"
181              LABEL="Database"/>
182          <INPUT ICON_INDEX="143"
183              LABEL="Input Parameter"/></ELEMENTS></VOCAB>
184    <VOCAB DTD="news.dtd"
185          KEY="SCRIPTINGNEWS"
186          LABEL="ScriptingNews-DTD"/></VOCABULARIES>
187 <ELEMENTS>
188    <BELLEVUE ICON_INDEX="135"
189          LABEL="Bellevue"/>
190    <CUSTOMER ICON_INDEX="138"
191          LABEL="Customer"/>
192    <DBDEFINITION ICON_INDEX="142"
193          LABEL="Database"/>
194    <FORSALE ICON_INDEX="139"
195          LABEL="For Sale"/>
196    <GENERAL ICON_INDEX="145"
197          LABEL="General"/>
198    <INPUT ICON_INDEX="143"
199          LABEL="Input Parameter"/>
200    <DBJOIN ICON_INDEX="144"
201          LABEL="Join Children"/>
202    <PROBLEM ICON_INDEX="147"
203          LABEL="Problem"
```

FIG. 5

Join Code page 1

```cpp
// this code called from within Process Element, at the point where we need to check if
JOIN is requested.
// execute any intermediate level nodes
    if (sExecType.CompareNoCase(TOKEN_JOIN) == 0) {
        CTreeItem *pBaseItem, *pJoinItem;
        CString    sJoin;
        CString sJoinKey;
        CString sJoinLabel;
        JoinType joinType;
        POSITION basePos;

// parameters for the join:
        //   JOIN_TYPE: INNER, OUTER
        //   JOIN_KEY: the key used to check the join condition
        //   JOIN_LABEL: the new key for the joined row // find join parameters
        SearchAttributeValue(CString(TOKEN_JOIN_TYPE),sJoin);
        if (sJoin.CompareNoCase(TOKEN_JOIN_OUTER) == 0)
            joinType = OuterJoin;
        else
            joinType = InnerJoin;

// get join key
        SearchAttributeValue(CString(TOKEN_JOIN_KEY),sJoinKey);

// get join label
        SearchAttributeValue(CString(TOKEN_JOIN_LABEL),sJoinLabel);

// take the first child as the source of the join,
        // join the second
        basePos = m_childList.GetHeadPosition();
        pBaseItem = (CTreeItem *) m_childList.GetNext( basePos );

while (basePos != NULL) {
            pJoinItem = (CTreeItem *) m_childList.GetNext( basePos );
            pBaseItem = pBaseItem->Join(pJoinItem,sJoinKey,sJoinLabel,joinType);
            ASSERT_VALID(pBaseItem);
        }

// now prune all children and replace with the new base
        for (pos = m_childList.GetHeadPosition(); (prevPos = pos) != NULL; ) {
            pChildItem = (CTreeItem *) m_childList.GetNext( pos );
            m_childList.RemoveAt( prevPos ); // remove what's at prevPos
            delete pChildItem;
        }

// add the generated children to this node
        for (pos = pBaseItem->m_childList.GetHeadPosition(); (prevPos = pos) != NULL; ) {
            pChildItem = (CTreeItem *) pBaseItem->m_childList.GetNext(pos);
            pChildItem->m_pParent = this; // reset the parent
            ASSERT_VALID(pChildItem);
            m_childList.AddTail(pChildItem);
            pBaseItem->m_childList.RemoveAt( prevPos ); // remove what's at prevPos
            ASSERT_VALID(this);
        }

} // end TOKEN_JOIN

//////////////////////////////////////////////////////////////////////////////
// Join - join the input subtree children with the current subtree's children,
// returning a new subtree as the result. The resulting parent is a copy of
// 'this', with joined children
CTreeItem *CTreeItem::Join(CTreeItem *pJoinTree,
                           CString sJoinKey,     // key to join on
                           CString sRowLabel,    // new row label
                           JoinType joinType)
{
    POSITION pos0;
    CTreeItem *pItem0, *pNewSubtree, *pSubtree0, *pSubtree1;
```

FIG. 13

Join Code page 2

```cpp
        ASSERT_VALID(pJoinTree);

// operate on the longest list as the source
    if (m_childList.GetCount() >= pJoinTree->m_childList.GetCount()) {
        pSubtree0 = this;
        pSubtree1 = pJoinTree;
    }
    else {
        pSubtree1 = this;
        pSubtree0 = pJoinTree;
    }

// create the join subtree to hold results
    pNewSubtree = new CTreeItem(m_sKey, m_sValue, m_attrList, m_pParent);

// now do list0 JOIN list1
    for (pos0 = pSubtree0->m_childList.GetHeadPosition(); pos0 != NULL; ) {
        CTreeItem *pKeyItem, *pTargetItem, *pMergedItem;
        pItem0 = (CTreeItem *) pSubtree0->m_childList.GetNext(pos0);
        // find the value of the row's Join Key item.
        pKeyItem = pItem0->SearchSubtree(
            (CString) TOKEN_WILDCARD + "/" + sJoinKey, TOKEN_WILDCARD);

// as long as we find a join key, try and join
        if (pKeyItem) {
            // search the join subtree for "*/*/JOIN_KEY/pKeyItem->m_sValue"
            if ((pTargetItem = pSubtree1->SearchSubtree(
                (CString) TOKEN_WILDCARD + "/"
                + TOKEN_WILDCARD + "/"
                + sJoinKey,
                pKeyItem->m_sValue)) != NULL) {
                // we have a join on this "row"
                CTreeItem *pNewItem = new CTreeItem(*pItem0);
                pNewItem->m_pParent = pNewSubtree;   // set the parent
                if (!sRowLabel.IsEmpty())
                    pNewItem->m_sKey = sRowLabel;

// merge for the join. Note that pTargetItem points to the
                // item containing the join key. We want to join at the row
                // level, which is the parent of this node.
                pMergedItem = pNewItem->Merge(pTargetItem->m_pParent);
                delete pNewItem;
                pMergedItem->RemoveDups();    // remove any dup children // add the joined child to the new parent
                pMergedItem->m_pParent = pNewSubtree;
                ASSERT_VALID(pMergedItem);
                pNewSubtree->m_childList.AddTail(pMergedItem);
            }
            else if (joinType == OuterJoin) {
                CTreeItem *pNewItem = new CTreeItem(*pItem0);
                pNewItem->m_pParent = pNewSubtree;
                pNewItem->m_sKey = sRowLabel;
                pNewSubtree->m_childList.AddTail(pNewItem);
            }
        }
        else if (joinType == OuterJoin) {
            CTreeItem *pNewItem = new CTreeItem(*pItem0);
            pNewItem->m_pParent = pNewSubtree;
            pNewItem->m_sKey = sRowLabel;
            pNewSubtree->m_childList.AddTail(pNewItem);
        }
    }

// return the joined tree
    ASSERT_VALID(pNewSubtree);
    return pNewSubtree;
}
```

FIG. 13

Join Code page 3

```
///////////////////////////////////////////////////////////////////////////
// Merge - Merge 'this' children with the input children, returning a newly
// created subtree
CTreeItem *CTreeItem::Merge(CTreeItem *pMergeTree)
{
    CTreeItem *pTreeItem = new CTreeItem(*this);   // copy current tree
    POSITION pos;
    CTreeItem  *pChildItem, *pNewChild;

// copy each subtree to target
    for (pos = pMergeTree->m_childList.GetHeadPosition(); pos != NULL; ) {
        pChildItem = (CTreeItem *) pMergeTree->m_childList.GetNext( pos );
        pNewChild = new CTreeItem(*pChildItem);
        pNewChild->m_pParent = pTreeItem;
        pTreeItem->m_childList.AddTail(pNewChild);
    } return(pTreeItem);
}

///////////////////////////////////////////////////////////////////////////

// RemoveDups - remove and delete duplicate children.  Two children are
// considered dups if they have the same sKey, sValue, and sAttributes
VOID CTreeItem::RemoveDups()
{
    POSITION pos, pos1, prevPos;
    CTreeItem  *pTreeItem, *pTargetItem;

// for each child, remove any dup later in the list
    for (pos = m_childList.GetHeadPosition(); pos != NULL; ) {
        pTargetItem = (CTreeItem *) m_childList.GetNext( pos );

// see if target is anywhere else in list, remove if so
        pos1 = pos;
        while ((prevPos = pos1) != NULL) {
            pTreeItem = (CTreeItem *) m_childList.GetNext( pos1 );
            if (pTreeItem->m_sKey == pTargetItem->m_sKey
                && pTreeItem->m_sValue == pTargetItem->m_sValue
                && pTreeItem->m_attrList == pTargetItem->m_attrList) {
                m_childList.RemoveAt( prevPos );  // remove at prevPos
                delete pTreeItem;
            }
        }
    }
}

///////////////////////////////////////////////////////////////////////////
// SearchSubtree - find the first tree item in the subtree given the path
// The subtree path may contain the wildcard character '*', which indicates
// all children of that node should be searched.
// Example:  SearchSubtree("*/CUST_ID", "000128") searches all children
// of the current subtree 'this' for the first child with key 'CUST_ID' and
// value '000128'.
CTreeItem *CTreeItem::SearchSubtree(CString sSearchPath, CString sValue)
{
    BOOL   pathEnd;
    CString  sKey, sRemains;
    int    iLoc;
    POSITION pos;
    CTreeItem  *pChildItem, *pFound;

// search all children for the given path component
    iLoc = sSearchPath.Find(SLASH_CHAR);
    if (iLoc >= 0) {
        sKey = sSearchPath.Left(iLoc);
        sRemains = sSearchPath.Mid(iLoc + 1);
        pathEnd = FALSE;
    }
```

FIG. 13

Join Code page 4

```
    else {
        sKey = sSearchPath;
        pathEnd = TRUE;
    }

// if we're at the end of the path, check to see if this node is it.
    if (pathEnd) {
        // we have a match if:
        //   1) exact match, 2) sKey is wildcard and value matches,
        //   3) sKey matches and sValue is wildcard, 4) both wildcard
        if ((m_sKey == sKey && m_sValue == sValue)
            || (sKey == TOKEN_WILDCARD && m_sValue == sValue)
            || (m_sKey == sKey && sValue == TOKEN_WILDCARD)
            || (sKey == TOKEN_WILDCARD && sValue == TOKEN_WILDCARD) )
            return this;
    }

// for each child, remove any dup later in the list
    for (pos = m_childList.GetHeadPosition(); pos != NULL; ) {
        pChildItem = (CTreeItem *) m_childList.GetNext( pos );
        // not the end of path, so keep searching if this is allowable path
        if (sKey == "*" || sKey == pChildItem->m_sKey) {
            if ((pFound = pChildItem->SearchSubtree(sRemains,sValue)) != NULL)
                return pFound;
        }
    }

// if we got here and we're at the end of the path, we didn't find it
    return NULL;
}
```

FIG. 13

Substitution Code page 1

```
///////////////////////////////////////////////////////////////////////
// find and replace all substitution strings.  A substitutable token has the form
// %%REF.  %% represents the token prefix, which can be changed by setting the
// parameter TOKEN_PREFIX.  REF is an internal document reference of the form
// <complex-path>.<attr>.  The "." character is the attribute specifier, and can be
// changed by setting the ATTR_DESIGNATOR system parameter.
// See CTreeItem::GetTreeItemComplexPath for complex-path definition.
// If <complex-path>. is omitted, /INPUT.<attr> is assumed, and the token
// evaluates to the attribute value of <attr> in the INPUT element.  If a path
// is given with no <attr>, then the token evaluates to the value of the resulting
// element.  Some examples:  %%FILENAME is transformed to /INPUT.FILENAME, which
// evaluates to the value of the FILENAME attribute in the INPUT element.
// ../ITEM.ID evaluates to the value of the ID attribute in the current parent's
// ITEM element.
CString CTreeItem::Substitution(CString &input, bool bKeyMap)
{
    CString sRemains = input;
    CString sToken, sResult;
    CString sDef, sValue;
    CTreeItem *pDefItem, *pRoot;
    bool   bReplaceSpecial=FALSE;
    _TCHAR cReplace;
    int iLoc=0, iLoc1, len;
    CString sAttr, sPath, sLast;

len = sRemains.GetLength();
    sResult = input;

// search for the INPUT element
    pRoot = TreeRoot();

// parse the input string for replacement tokens
    do { sRemains = sResult;
        iLoc = sRemains.Find(TOKEN_PREFIX);
        if (iLoc < 0)   // all substitutions performed
            break;

iLoc += TOKEN_PREFIX_LEN;
        sRemains = sRemains.Mid(iLoc);

// get end of line or space to end this token
        sToken = sRemains.SpanIncluding(PARAM_CHARS);

// if this is single name token, put in special-case defaults
        // this is a deprecated feature that will soon go away!
        if (sToken.SpanExcluding(TOKEN_NAME_CHARS).IsEmpty()) {
            sAttr = sToken;
            pDefItem = pRoot->FindChildElement(TOKEN_INPUT);
        }
        else {
            // Split token into path-last-attr parts
            // find the last path component
            if ((iLoc1 = sToken.ReverseFind(SLASH_CHAR)) >= 0) {
                sLast = sToken.Mid(iLoc1);   // note: don't discard '/'
                sPath = sToken.Left(iLoc1);
            }
            else {
                sLast = sToken;
                sPath = "";
            }

// split attr from sLast
            if ((iLoc1 = sLast.ReverseFind(ATTR_DESIGNATOR)) >= 0) {
                sAttr = sLast.Mid(iLoc1+1);
                sLast = sLast.Left(iLoc1);
            }
            else {
                sAttr = "";
```

FIG. 14

Substitution Code page 2

```
            }

// now put the path back together
            sPath = sPath + sLast;

// get the tree item.  If full path given, search from root, otherwise
            // relative path from current tree item
            if (sPath[0] == SLASH_CHAR)
                pDefItem = pRoot->GetTreeItemComplexPath(sPath);
            else
                pDefItem = GetTreeItemComplexPath(sPath);
        } if (pDefItem) {
            // get the substitution value
            if  (sAttr.IsEmpty())
                sValue = pDefItem->m_sValue;
            else
                pDefItem->m_attrList.Lookup(sAttr,sValue);
        }
        else
            sValue = "";     // blank it out // found it, so make the substitution
        // put the sub string into the original
        sResult = sResult.Left(iLoc-TOKEN_PREFIX_LEN)
            + sValue
            + sResult.Mid(iLoc + sToken.GetLength());

} while (TRUE);

// perform the character mappings, if requested
if (bKeyMap) {
    // substitute any mapped characters
    CString sMap;
    sMap.Format(XML_CHAR_MAP);

// do basic error checking
    if (sMap.GetLength()) {
        if (sMap[0] != DEFINE_CHAR && sMap[sMap.GetLength()-1] != DEFINE_CHAR) {
            int iMap;
            len = sRemains.GetLength();
            sRemains = sResult;
            do {
                iMap = sMap.Find(DEFINE_CHAR);
                if (iMap <= 0)
                    break;
                // set flag to replace special chars
                if (sMap[iMap-1] == XML_SPECIAL_REPLACE_FLAG) {
                    bReplaceSpecial = TRUE;
                    cReplace = sMap[iMap+1];
                }
                else {
                    // replace all instances
                    do {
                        iLoc = sRemains.Find(sMap[iMap-1]);
                        if (iLoc < 0)    // all substitutions performed
                            break;
                        sRemains.SetAt(iLoc,sMap[iMap+1]);
                    } while (TRUE);
                } sMap = sMap.Mid(iMap+2);
            } while (TRUE);
        }
    }

// replace all special chars if indicated
    unsigned long ch = XML_SPECIAL_CHAR_VALUE;
    if (bReplaceSpecial) {
        for (iLoc = 0; iLoc < sRemains.GetLength(); iLoc++)
```

FIG. 14

Substitution Code page 3

```
            if (((unsigned) sRemains[iLoc] > ch)
                sRemains.SetAt(iLoc,cReplace);
        }
    } return sRemains;
}

////////////////////////////////////////////////////////////////////////////
// Get the first subtree at the specified complex-path.  A complex-path
// has components of form /KEY:ID="VAL1"/SUBKEY:ID="999"/... Only a single
// attribute is supported currently, but this may be expanded in the future
// to support any number of keys.  As a shortcut, if attribute name is left out,
// 'ID' is assumed, e.g. above example is same as /KEY:"VAL1"/SUBKEY:"999".
// The path may be relative, using path component '.' to represent the current
// directory, '..' to represent a parent directory.  Leading '/' represents
// the root of the tree.                     ┌─410
// Return NULL if not found.
┌─CTreeItem *CTreeItem::GetTreeItemComplexPath(CString sPath)
┌ (
401    BOOL    pathEnd;
       CString   sKey, sRemains, sIdAttr, sIdValue;
       int     iLoc;
       int       iIndex, iChild;
       BOOL    bAttr=FALSE, bIndex=FALSE;
       POSITION pos;
       CTreeItem *pChildItem, *pFound;

// check for reference to parent
       if (sPath[0] == DOT_CHAR && sPath[1] == DOT_CHAR) {
           ASSERT_VALID(m_pParent);
           sPath = sPath.Mid(2);
           return m_pParent->GetTreeItemComplexPath(sPath);
       }

// search all children for the given path component sKey.  Strip leading '/', './'
       if (sPath[0] == DOT_CHAR)
           sPath = sPath.Mid(1);
       if (sPath[0] == SLASH_CHAR)
           sPath = sPath.Mid(1);
       iLoc = sPath.Find(SLASH_CHAR);
       if (iLoc >= 0) {
           sKey = sPath.Left(iLoc);
           sRemains = sPath.Mid(iLoc + 1);
           pathEnd = FALSE;
       }
       else {
           sKey = sPath;
           pathEnd = TRUE;
       }

// within the path component sKey, separate out the identifying attr-value pair(s)
       if ((iLoc = sKey.Find(ATTR_DESIGNATOR)) >= 0) {
           bAttr = TRUE;
           sIdAttr = sKey.Mid(iLoc+1);
           sKey = sKey.Left(iLoc);

// find attribute value. If we have single value instead of "ID=val" form,
           // then assume the attribute is "ID", and only value is supplied.

if ((iLoc = sIdAttr.Find(EQUAL_CHAR)) >= 0) {
               sIdValue = sIdAttr.Mid(iLoc+1);
               sIdAttr = sIdAttr.Left(iLoc);
           }
           else {
               sIdValue = sIdAttr;
               sIdAttr = ATTR_ID;
           }
           StripQuotes(sIdValue);
       }
       else if ((iLoc = sKey.Find(INDEX_DESIGNATOR)) >= 0) {
```

FIG. 14

Substitution Code page 4

```
            // hash mark indicates a 1-based index
            CString sIndex;
            bIndex = TRUE;
            sIndex = sKey.Mid(iLoc+1);
            sKey = sKey.Left(iLoc);
            iIndex = atoi(sIndex);
        }
        else
            bAttr = FALSE;    // no attribute search at this level //-------------------------------
    // for each child, search for match and proceed with lower level search
    // If children are indexed on ID, lookup the child directly, otherwise, search
    // children.
    if (m_childLookup) {
        pChildItem = GetHashedChild(sIdValue);   // ID is Hash value // not the end of path, so keep searching if this is allowable path
        if (bAttr) {
            if (sKey == pChildItem->m_sKey && pChildItem->m_attrList[sIdAttr] ==
sIdValue) {
                if (pathEnd)
                    return pChildItem;
                else if ((pFound = pChildItem->GetTreeItemComplexPath(sRemains)) != NULL)
                    return pFound;
            }
        }
        else {    // ignore attributes
            if (sKey == pChildItem->m_sKey) {
                if (pathEnd)
                    return pChildItem;
                else if ((pFound = pChildItem->GetTreeItemComplexPath(sRemains)) != NULL)
                    return pFound;
            }
        }
    }

// otherwise do a sequential search
    iChild = 0;
    for (pos = m_childList.GetHeadPosition(); pos != NULL; ) {
        pChildItem = (CTreeItem *) m_childList.GetNext( pos );
        // not the end of path, so keep searching if this is allowable path
        if (bAttr) {
            if (sKey == pChildItem->m_sKey && pChildItem->m_attrList[sIdAttr] ==
sIdValue) {
                if (pathEnd)
                    return pChildItem;
                else if ((pFound = pChildItem->GetTreeItemComplexPath(sRemains)) != NULL)
                    return pFound;
            }
        }
        else if (bIndex) {
            // if this is the right key, increment count and check if we're there
            if (sKey == pChildItem->m_sKey && ++iChild == iIndex) {
                if (pathEnd)
                    return pChildItem;
                else if ((pFound = pChildItem->GetTreeItemComplexPath(sRemains)) != NULL)
                    return pFound;
            }
        }
        else {    // ignore attributes, get the first of this key
            if (sKey == pChildItem->m_sKey) {
                if (pathEnd)
                    return pChildItem;
                else if ((pFound = pChildItem->GetTreeItemComplexPath(sRemains)) != NULL)
                    return pFound;
            }
        }
    }

// if we got here and we're at the end of the path, we didn't find it
```

FIG. 14

Substitution Code page 5

```
        return NULL;
}
```

FIG. 14

DYNAMIC, HIERARCHICAL DATA EXCHANGE SYSTEM

CROSS REFERENCES TO RELATED APPLICATIONS

This is a continuation of co-pending U.S. application Ser. No. 09/264,101, filed on Mar. 18, 1999, which application is hereby incorporated by reference herein.

This application claims the benefit of Provisional Patent Application Ser. No. 60/077,259, Filed 1998, Mar. 9.

FIELD OF THE INVENTION

The present invention relates to networked computer systems in which a plurality of interconnected computer systems exchange data.

BACKGROUND OF THE INVENTION

The present invention relates to computer systems interconnected by a network, suitably configured to transfer data between one another. A computer system connected to the network processes data from a plurality of data sources. A data source can be an input device attached to the computer system, or can be a storage device, memory, database, or other computer system attached either locally or remotely to the computer system via a network. In the network of computers, at any given time, a computer system may assume a specific role, relative to the processing of data. A computer system that sends a request for data from another computer system is said to be a Client system 1. The computer system that processes requests from other computer systems is said to be a Server system 2. When a Client sends a request for data to a Server, the Server may retrieve some of the requested data from its local resources, and some of the data from an External source 3 on the network. The Server 2 in this case acts as a Client to an External source 3, requesting the appropriate data, and the External source 3 acts as a Server. Thus, a computer system on the network may at one time perform the role of a Client, and at another time perform the role of a Server.

Servers on the network are designed to satisfy requests for a particular type of data. For example, a database server may be designed to accept Structured Query Language (SQL) requests from clients. The database server will execute the SQL and return the resulting database data to the requesting client. A Hyper Text Transfer Protocol (HTTP) server (or Web Server) accepts HTTP request from client systems (generally Web Browsers), processes the requests, and returns the resulting Hyper Text Markup Language (HTML) to the client. In an enterprise business environment, such as the Information Processing environment of a large company, a Server system may accept requests for customer account information. A Client may send the request to the Server in an agreed-upon format, and the Server locates the information within its system or a connected system, then returns the customer account information to the Client. Frequently, in the enterprise business environment, the nature of the large systems involved dictates that the data exchange uses a custom data format instead of an industry standard such as SQL or HTML.

Large corporations often house data in a multitude of sources, such as a host, database, server, or other information source. Often, one computer system may need to retrieve data from many other systems in order to perform its function. Systems in this environment contain complex programs that understand the intricacies of interfacing to each system that contains a data item in need. Such programs are complex to write and maintain, require great expense to development and modify, and are large in size due to the amount of code required for the large number of interfaces. In addition, typical systems access data sequentially, thus perform operations slowly more slowly than if data could be retrieved in parallel. More advanced systems perform some data retrievals in parallel, but the complexity of this type of system requires greatly more experienced programmers and testers, thus significantly increasing the cost of system development. Finally, the code developed to interface to each system and each data source is not easily reused in other systems in the enterprise for a variety of reasons. Program A may be a customer service application and may access servers 1, 2, and 3. Program B developed by another group may be a billing system that accesses servers 1, 2, and 4. Some reasons for low success rate of reuse are the fact that programs perform vastly different functions (service vs. billing), so developers often do not recognize the possibilities of reusing code. Tools to assist in reuse are not widely used, developers are generally slow to be convinced that existing components will precisely fit their needs, and current engineering practices that emphasize reuse have not been widely adopted in many corporations. In the cases where code is reused, it often is copied and customized by a programmer, requiring work for the customization and testing for the resulting implementation.

When a Client requires data from many different sources, it must contain a method and apparatus to send a request to each Server providing each type of required data. The Client also must have a method and apparatus to both receive the response data from the Server and to make sensible use of the data. Likewise, a Server needs a method and apparatus to process requests from Clients, and return resulting data to them. In the typical enterprise computer system environment, the methods and apparatuses for both Client and Server must be developed, integrated, tested, and deployed.

The methods and apparatuses necessary for a Client to usefully retrieve and process data from a Server is called an Interface. The code components involved in an Interface are shown in FIG. 3. The Client makes a request from the Request Code 4, which contains the method and apparatus to send the request to the Server and receive the result. The Request Code uses information from the Data Source Description Code 5 component located on the Client, which contains the method and apparatus to identify how to physically connect and maintain a connection to the Server. The Server component contains a Service Processor 6 that contains the method and apparatus to receive the request, cause the Server to process the request, then return the results to the Client. The Request Code for the Client receives the request, then identifies and interprets each element of information in the return using the method and apparatus contained in the Parsing Code 7. In total, 4 components must be developed for each interface.

Many computer systems use standard interface components such as those supporting SQL requests to database management systems (DBMS) to drastically reduce development time. Unfortunately, many computer systems in large enterprise environments require interfaces customized for the particular Client and Server pair. For these systems, a large number of interface components must be developed. As an example, assume two client systems interface with 4 server systems as shown in FIG. 3. Each server requires a Service Processor. Each Client requires Request Code, Server Description Code, and Parsing Code for each interface, therefore Client 1 requires 9 components and Client 2 requires 9 components, for a total of 22 total development components for the depicted interfaces. It is possible for Clients to share interface components, for example, Client 2 can reuse the code developed in Client 1 for its interface to Server 1. However, it is more often the case in large enterprise environments for Client 1 and Client 2 to be developed by separate groups, and the opportunity to reuse the code is not exploited.

There is a need for an interface strategy that organizes the implementation of the interface components, so that interface components are only developed a single time, regardless of the number of Clients implementing similar interfaces to various servers. This would result in fewer development resources being expended, because many of the interface components would be developed a single time, instead of once for each Client system.

Client systems generally request data in a sequence of steps. For example, a customer service application may perform the following sequence of processing steps: 1) obtain a customer phone number from the user, 2) request account information such as name, address, and account number from a Server, 3) send request to another Server to retrieve current order information, 4) send a request to the same server to retrieve order detail information, 5) send request to yet another Server to request service contact history. Each request in the sequence requires a different parameter in order to carry out the request. The original customer account request requires the customer's phone number. The request to retrieve order information requires an account number that is retrieved with the account information. The request to retrieve order detail requires an order number, which is retrieved with the order information. The request to return service contact information requires an account number. The cumulative data comprising customer account, order information and service history can be said to be a single Data File constituting the current status of the customer. The specification of the contents of a Data File is said to be the Document Definition of the Data File. Though a more formal specification is required in practice, in the current example, the Document Definition would state that the Data File contains account, order, and service history information. A Client can thus request a single data file for a particular customer, even though the source information is stored in separate Servers.

Szlam et al. (U.S. Pat. No. 5,675,637) describe a means and apparatus for obtaining and displaying data with sequentially dependent information. However, there is a need to automatically obtain sequences of information from a plurality of data sources where vastly different Clients are supported. There is a need for defining the cumulative data file independent of any display, rendering, or presentation system, so that Clients of vastly differing types can obtain full information without developing interface code. For example, a customer data file as in the above example would be useful for a desktop client, a browser-based client, an Interactive Voice Response (IVR) unit or Voice Response unit (VRU), a hand-held computer, an invoice printing system, and a vast assortment of other uses.

Many servers provide conglomerations of data in a predetermined format. But since different types of clients have different formatting needs, there is a need for the information in the resulting data file to be formatted according to client preference, without having to create a new Document Definition for the data file. If a client has a particular format requirement, there is a need for the data file to be made to conform to this new format for this client, and for said new format to be further available to other clients upon request. The ability to render the same information in different formats is enabled by abstracting the information itself from the format of the information.

Current DBMS Servers satisfy requests for data that is generally row-based. Row-based data is appropriate for clients in many instances, such as requesting data that will populate a visual table on a display screen. Often, a Client desires more complex information, as in the case of the customer Data File in the above example. A DBMS cannot process a request for an arbitrarily complex hierarchy in a single request, because requests to a DBMS are row-based. Instead, multiple requests to the Server are required to obtain data representing an arbitrarily complex set of data. There is a need for data servers to support arbitrarily complex hierarchies of data. International standards such as those defining SGML and XML support data file formats that represent arbitrarily complex hierarchies of data. Hierarchies can, of course, represent rows of data just as a DBMS does, plus other arbitrary sets of data.

Current Servers supporting delivery of Data Files generally retrieve the Data File from a source, or generate the Data File in code, then return it to the Client. The resulting Data File is fixed in size and information content, regardless of whether the client needs the entire set of information. For clients requiring less than the entire set of information, this very inefficient, as unneeded data is generated, formatted, and transmitted to the client. The client must read and parse the entire Data File. There is a need for clients to be able to flexibly select only those portions of the Data File that suits their particular purpose at the time.

Current DBMS's are Servers that act on data requests of clients. One advanced data manipulation feature of these systems (Oracle, Sybase, Informix, Microsoft SQL Server) is to perform a join operation on table data. Oracle is one example DBMS that allows a join across data tables on different Servers, even servers running different vendor's DBMS. But the join is limited to row-based tables, with the result of the join being row data.

There is a need for Clients to be able to request a join of data that has rich, hierarchical information, such as the customer Data File in the above example. The join operation should also not be constrained to operate on a particular source of data, such as a DBMS, but rather should work on data from any source whatsoever.

Current Servers can easily handle Data Files that are completely static. However, if some or all of the data file is dynamic, an intricate program must be developed to produce the dynamic portions and insert them appropriately into the Data File. Microsoft's Active Server Pages and Allaire's Cold Fusion are examples of systems that simplify mixing dynamic with static data for internet-based Data Files. However, these systems do not provide the capability to generate arbitrary levels of hierarchical data, so are limited in the complex data structures they can generate. There is a need to easily define static and dynamic portions of a Data File, while not limiting the complexity of the resulting data.

Such a method is difficult to change when the needs of the client system changes. The present invention provides a single data file generation engine, which can construct an infinite number of different types of data files. To enable the generation of a new type of data file, a user simply creates a new DDF and ensures the DDF is accessible to the Data Server. To make a modification to an existing type of data file, the user simply edits the DDF with the current inventions Authoring System, then the next time that type of data file is requested, the new format is used. All changes are effected with no changes to the software code, therefore no programmer must be hired to make the changes. New data file types and changes to existing data file types are easily made by an administrator.

OBJECTS AND ADVANTAGES

The present invention provides several objects and advantages as follows:
1. Interface code is organized so that a plurality of Clients need only one set of Request Code, Data Source Description, and Parsing Code. Requests are all passed through to a Hierarchical Data System (HDS), which retrieves the knowledge of how to construct the various dynamic portions of data, and pass the data back in a Client designated format. The format can be XML or other industry or organization standard where parsing code is readily available.
2. A series of interdependent data requests can be defined in a Document Definition File (DDF). Elements in the DDF can reference previously generated data as keys, therefore the Client need not be concerned with ordering of requests. A Client can request the entirety of data in a single request, then process the data as it sees fit.
3. Data is defined abstractly as a hierarchy of elements, able to model any data set. The generation of the data is independent of the output of the data to the client. The output format of the resulting data file can be selected by the Client, for example, XML, key-value pair, binary stream, ASCII stream, etc. Supported formats can be extended, resulting in an infinite number of possible formats.
4. Conditional data element generation is provided, so that a Client can select portions of a data file of interest, filtering out those that are not of concern at a particular time. A Client in one instance can request that data sections A, B, and C be generated and delivered. In another instance, the Client may not need element B, so it will request the same data file with only data section A and C, thus saving the time and expense of generating, formatting, then delivering unneeded components.
5. A Join operation is provided, similar to the database Join operation, but with extension to work against hierarchical data, and data from any available source, not just database data.

Further objects and advantages of the present invention will become apparent from a consideration of the drawings and ensuing description.

SUMMARY OF THE INVENTION

The present invention overcomes the limitations of the prior art by providing a highly flexible Hierarchical Data Server (HDS) and accompanying Document Definition Authoring System. The Authoring System creates Document Definition Files (DDF), which specify hierarchically related elements, each of which is capable of generating dynamic data. A Client sends a request to the HDS, indicating which DDF is desired, and a list of parameter substitutions that the HDS is to apply to the DDF. The HDS processes all elements in the DDF, dynamically generating data, then outputs the data in a format requested by the Client.

FIG. 15 shows an overview of the HDS and Authoring System. A Client system 200 requiring data from various Enterprise System 202, including databases, hosts, and any other data source, will arrange for a new DDF 204 to be created using the Authoring System 203. The Authoring System 203 is used to define the structure and data sources for each element of data requested, and the parameters that can be used to customize the DDF 204 for any particular Client's purpose. The DDF 204 is stored in a location convenient for the HDS 201 to access it upon request.

When the Client 200 needs the data, it sends a request over the interface 205 to the HDS, specifying the DDF name and any needed parameters. The HDS 201 reads the DDF into memory, performs parameter substitution, and executes each element. The execution of elements is expected to cause a plurality of data requests to be processed over the Data Transactions Interface 206, retrieving data from the various Enterprise Systems 202, and returning the data over the interface to be placed in a DDF element on the HDS 201. After all elements are fully executed, the HDS 201 formats the resulting data into a Data File, and transmits the Data back to the Client 200 over the interface 205.

BRIEF DESCRIPTION OF THE DRAWINGS

A preferred embodiment of the present invention will be described below relative to the following figures.

FIG. 5, System Parameter File, is an example parameter file used by a preferred embodiment of the invention to dictate processing by the Authoring System and the Hierarchical Data Server (HDS).

FIG. 13, Join Code, is a C++ coding example, demonstrating the important steps required in the processing of a Join operation.

FIG. 14, Substitution Code, is a C++ coding example, demonstrating the important steps required in performing parameter substitution prior to execution of dynamic elements.

DETAILED DESCRIPTION OF THE INVENTION

The preferred embodiment of the present invention provides a Hierarchical Data Server which reads a Document Definition File upon request from a Client, performs parameter substitution as specified in the Client's request, then visits each element in the Document Definition File, dynamically executing each element until all elements are complete, then formats the resulting data into a Data File in the format requested by the Client. A Document Definition Authoring System is provided to assist in the construction and maintenance of Document Definition Files.

Document Definition File

Figure 16:
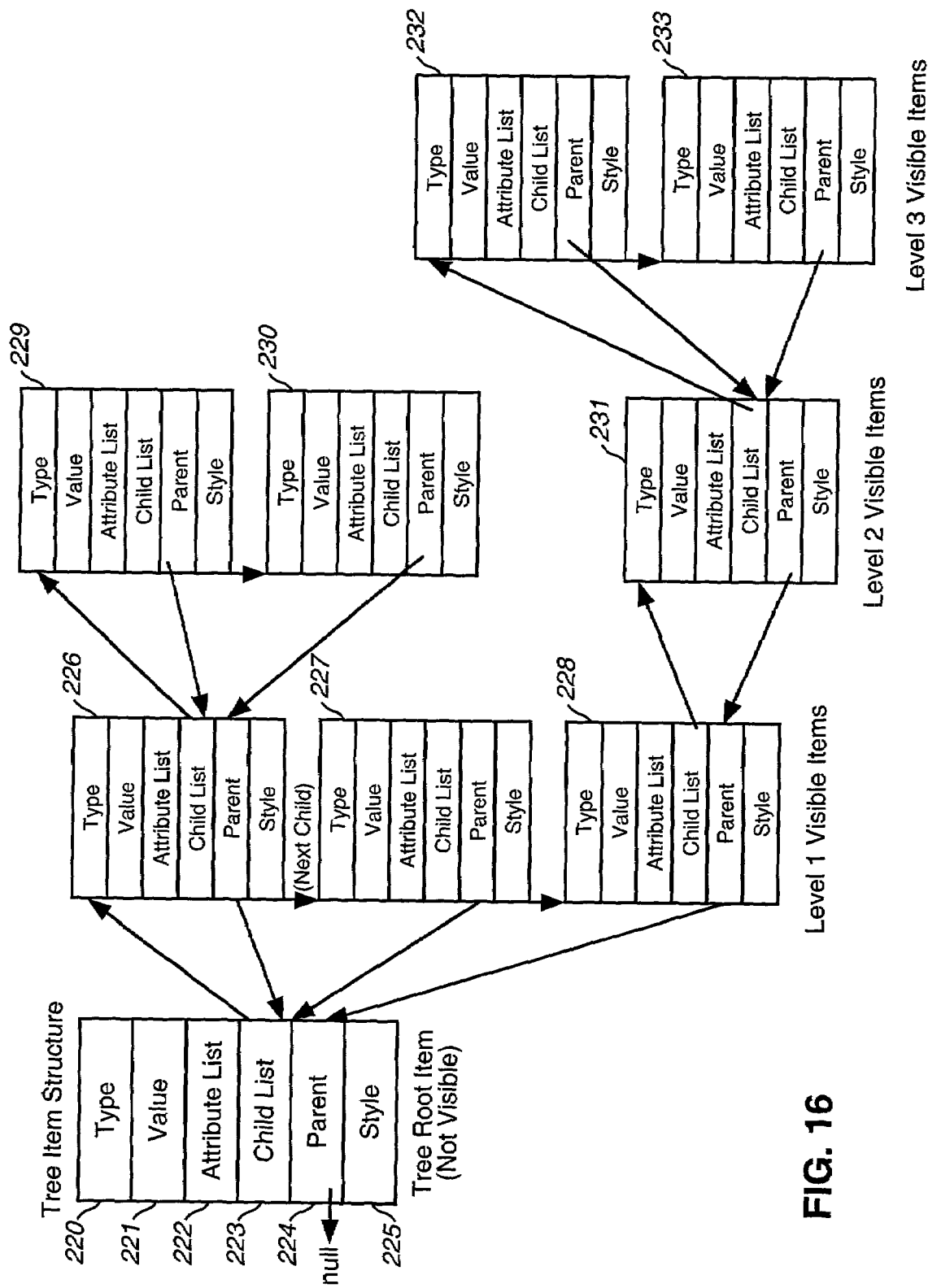
FIG. 16, DDF Document Structure, is a diagram depicting the element data structures useful in implementing the preferred embodiment of the present invention.

According to a broad aspect of a preferred embodiment of the invention, a computer system specifies the content, sources, and method of generation of a collection of data and stores this in a file (a Document Definition File, DDF). The type of data that can be defined is very general and is restricted only in that it must fit into a hierarchical structure. Importantly, the DDF is not limited to information of a static or unchanging nature. Instead, the DDF is a hierarchy of elements, each of which may specify static data, or indicate a mechanism to fetch data dynamically. FIG. 16 shows a pictorial view of the element hierarchy of a DDF. Formally, a DDF is defined as a list of elements, where each element is defined as consisting of the following components:

1. Type 220: a character string naming the type of the element
2. Value 221: a character string representing the value of this element
3. Attribute List 222: list of attributes represented as key-value pairs, each key-value pair consisting of:
   a) Key: a character string naming the attribute
   b) Value: a character string representing the value of the attribute
4. Style 225: a character string designating the output formatting for this element
5. Children 223: a list of zero or more elements.

As indicated above, each element contains, among other things, a list of zero or more elements representing the children elements of the present element. Thus, the mechanism is provided to build arbitrarily complex hierarchies of data.

Addressable DDF Components

Each component of each element in the DDF is addressable by specifying a complete path to the component. Since the DDF is a hierarchy of elements, it is convenient to think of components of the DDF as a file system. Just as files in a file system can be referenced with a full pathname, so can elements in a DDF. For example, the path /CUSTOMER/ORDER/ORDER_ITEM specifies an element of Type ORDER_ITEM that is a child of an element of Type ORDER, which itself is a child of an element of Type CUSTOMER. Such a path is called a reference. Whereas a file system houses components of individual files, a richer scheme is required with DDFs to address individual components within an element. Also, although filenames are unique in a particular subdirectory, many children of an element can normally do have identical Types. Thus the addressing scheme is expanded as follows: Each path component can take the form <Type>#<index> or <Type>.<attr>=<attr_value>, where <Type> is a the element Type, <index> is a number indicating the sequence number of the element referenced, <attr> is an attribute key, and <attr_value> is an attribute value. Several shortcuts are allowed: if <attr> is missing, "ID" is assumed. If #<index> is missing, the first instance of the given Type is referenced. Thus, "/CUSTOMER#3/ORDER.NUM=003/ORDER_ITEM.2" references ORDER_ITEM with attribute ID=2, which is the child of element ORDER with attribute NUM=003, which is the $3^{rd}$ element of Type "CUSTOMER" in the root level of the document.

The previous example begins with the character '/'. This character at the beginning of an address specifies that the reference begins at the root of the element hierarchy in the document. If the slash is missing, the reference is a relative reference. If processing is currently occurring on the element of Type ORDER, with attribute NUM=003, a relative reference such as "ORDER_ITEM.2" refers to a child element of the current element, with Type ORDER_ITEM and attribute ID=2. As in a file system, the relative reference ".." refers to the current element's parent, and "./" refers to the current element. If processing again is occurring on the element of Type ORDER, with attribute NUM=003, the reference "../ORDER#1" refers to the first element of type ORDER that is a child of the current CUSTOMER element.

Replacement Operator

Elements in a DDF can specify reference to other elements in the DDF. By prefixing a reference with the special replacement operator "%%", direction is given to replace the reference with the value of the reference. For example, %%/CUSTOMER#3/ORDER.NUM=003/ORDER_ITEM-.NAME is a directive to replace the string "%%/CUSTOMER#3/ORDER.NUM=003/ORDER_ITEM.2" with the Value component of the element with Type ORDER_ITEM and ID=2.

Executable Elements

Elements in the DDF can be either static or dynamic. Static elements are defined with element components that do not change. Dynamic elements must be executed in order to generate data for the element. For example, an executable element may generate data from a DBMS by sending an SQL statement to the DBMS. The result is a sequence of rows, each of which contain columns of data. Upon execution, the original element is updated to include a child element for each row retrieved. For each of these child elements, elements are constructed to contain each column within the row.

The Data File

Every element in the DDF is potentially executable. In addition, every generated child of an executable element may itself be executable. Thus, provisions are made to visit and attempt to execute every element. After an element is executed, its children are visited and they are executed if appropriately. The process continues recursively until all elements are executed. Once execution of all elements are complete, the set of elements are formatted and returned to a client. The resulting output is called a Data File (DF).

Hierarchically Embedded Executable Elements

The original executable element in the previous example specified an SQL statement. In addition, it may also contain a list of children elements, some of which may be executable. Upon generation of each element for the returned data rows, the original child elements are replicated in these elements. The replicated elements may make use of the newly generated elements by using relative references.

As an example, assume the original element contained the following SQL statement: "select ORDER_DATE, NUM from orders where CUSTOMER_ID=432". This query, when executed on an appropriate database, will return a list of rows containing a date and a number, one row for each order in the table for the customer with ID 432. Let's assume the following 3 rows are returned:

| Feb. 27, 1999 | 002 |
| Mar. 1, 1999 | 003 |
| Mar. 2, 1999 | 005 |

This results in 3 new children for the original element, one for each row returned. Each of the three new elements would contain two generated elements, one containing the date, and one containing the order number. Let's assume now that the original element has a child element. The child element is replicated as a child in each of the 3 generated row-level elements above. The original child element can be executable, and can also refer to the newly generated children, having foreknowledge of what will be generated. In particular, it may be useful to execute an SQL statement that generates ORDER_ITEM elements by referring to the generated NUM field. This SQL statement might look like this: "select NAME, ITEM_NUM from ORDER_ITEMS where ORDER_NUM=%%./NUM". At execution time, %%./NUM is treated as a relative reference to the child element of type NUM. The Value field of this element is retrieved and used in place of "%%./NUM". The query is executed and additional children elements are created, expanding the hierarchy depth. The hierarchy can be endlessly extended with ever-deeper children, each of which are replicated then executed.

DDF Parameters

In another aspect of a preferred embodiment of the invention, a DDF can define parameters for a Client's use, so that a Client can specify customization for a generated Data File. A DDF that generates customer account data, for example, may define a DDF parameter for customer phone number. The DDF parameter can be defined anywhere, but it is convenient to define a standard location, which we will call the INPUT element. This is an element in the document of Type INPUT, where attributes can be stored as DDF parameters. The input attribute is generally created as a template attribute at the time the DDF is created. For example, the INPUT element of the customer account DDF may contain the attribute PHONE=1112223333. A Client may request the customer account DDF, and specify a parameter substitution "/INPUT.PHONE=7195551212". Assuming the INPUT element is a root-level element, a processing engine would replace the value of the PHONE attribute with "7195551212" prior to executing any elements in the DDF. Execution would proceed, and presumably one or more executable elements would use a replacement operator referring to this input parameter. As an example, an SQL select statement might contain the reference %%/INPUT.PHONE in a where clause, thus selecting data for the appropriate customer.

Several shortcuts are possible in parameter references. Input parameters could refer simply to attributes in the INPUT element. Thus, input parameter PHONE=7195551212 is equivalent to "/INPUT.PHONE=7195551212", and the replacement reference %%/INPUT.PHONE can be shortened to %% PHONE.

Data File Formatting

In another aspect of a preferred embodiment of the invention, after a DDF is fully executed, remaining elements are output using customized formatting options. A system parameter file contains formatting commands for each type of element Style. The formatting occurs by processing each element recursively, and applying the formatting commands specific to the element's Style.

Domains

Available formatting styles are gouped into Domains. A Style indicator can reside in several Domains, with each Domain defining a different format for the Style. Thus, selecting a Domain specifies the output format of the DDF. A DDF can specify a default Domain for generated Data Files by specifying the Domain in the GEN_TYPE attribute. This attribute is generally in the first element in the document, though it does not need to be. A Client may request a specific output format by setting the GEN_TYPE attribute in a parameter specification.

Hierarchical Data Server

In another aspect of a preferred embodiment of the invention, a computer system is capable of receiving requests for data files. Each request for a data file includes a reference to a DDF, plus parameters. The Server receives the request, reads the DDF into memory, and performs parameter substitutions for any parameter supplied by the Client. The Server then visits each element in the DDF, first performing replacement for any replacement operation (references preceded by "%%"), then executing the element if possible. Elements are recursively processed. After completion of all execution, processing occurs for formatting and output. All elements are again visited, and output according to formatting commands based on the indicated Style of the element and the DDF's Domain. The fully processed output is then returned to the Client.

The Server in this example is called a Hierarchical Data Server, or HDS.

Document Definition Authoring System

The job of creating DDFs can be very complex in the enterprise environment. To assist in creation and editing of DDF, the present invention specifies a computer system that assists a human in constructing DDFs. This computer system is called a Document Definition Authoring System (hereinafter referred to as Authoring System).

Figure 4A:
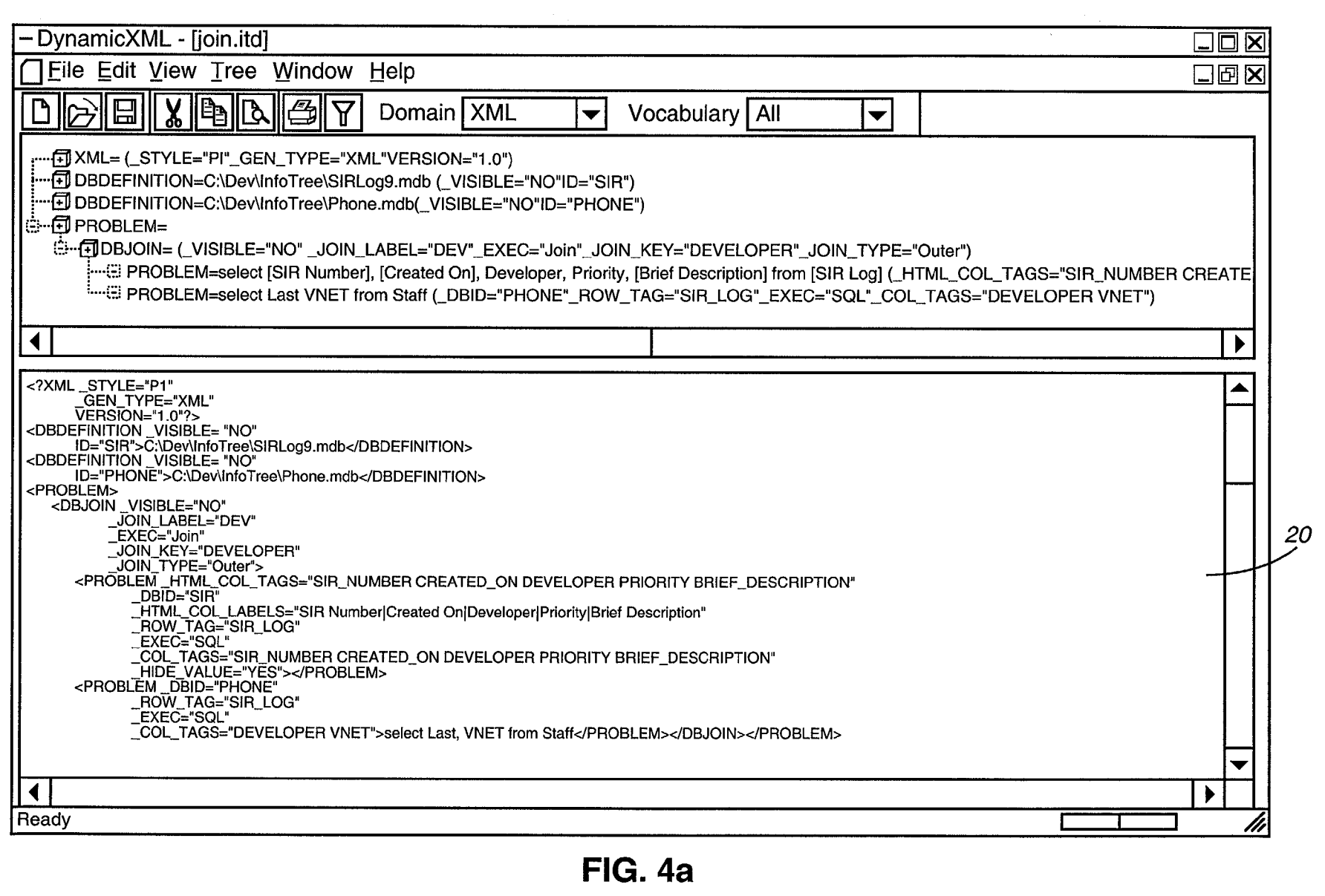

FIG. 4a shows a preferred implementation of the Authoring System. FIG. 4a shows the DDF named join.itd. The top window panel shows a graphical tree representation of the document which is constructed using the Microsoft Foundation Classes CTreeCtl class. The elements include an element of Type "XML" that generates an XML header for the file, an Input element that lists the parameters and values for the document, a Database element that defines the data source for all subsequent statements, and a PROBLEM element. The PROBLEM element has two children elements, each containing an SQL select statement.

The lower portion of the window shows the same DDF in XML format. This panel is not modifiable.

Figure 4B:
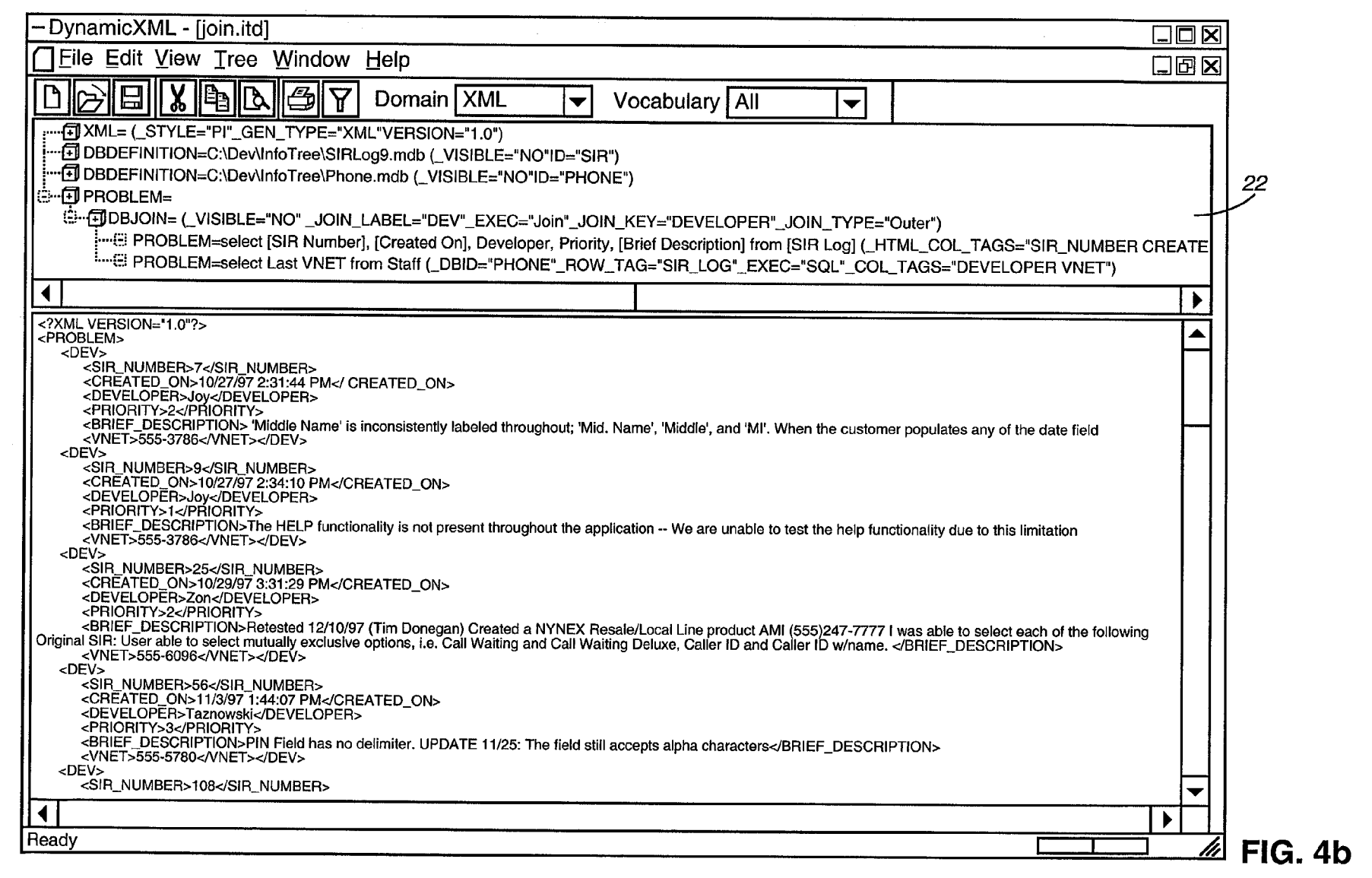

The View menu includes an option, "Expand Expressions", which executes the elements to produce the resulting Data File. The option File/Export performs this function also, storing the results to a file. View/Expand Expressions option produces the results as shown in FIG. 4b.

Appropriate commands are supplied to insert new elements at a selected location, edit existing elements, delete elements, and drag and drop elements to new locations.

Figure 4C:
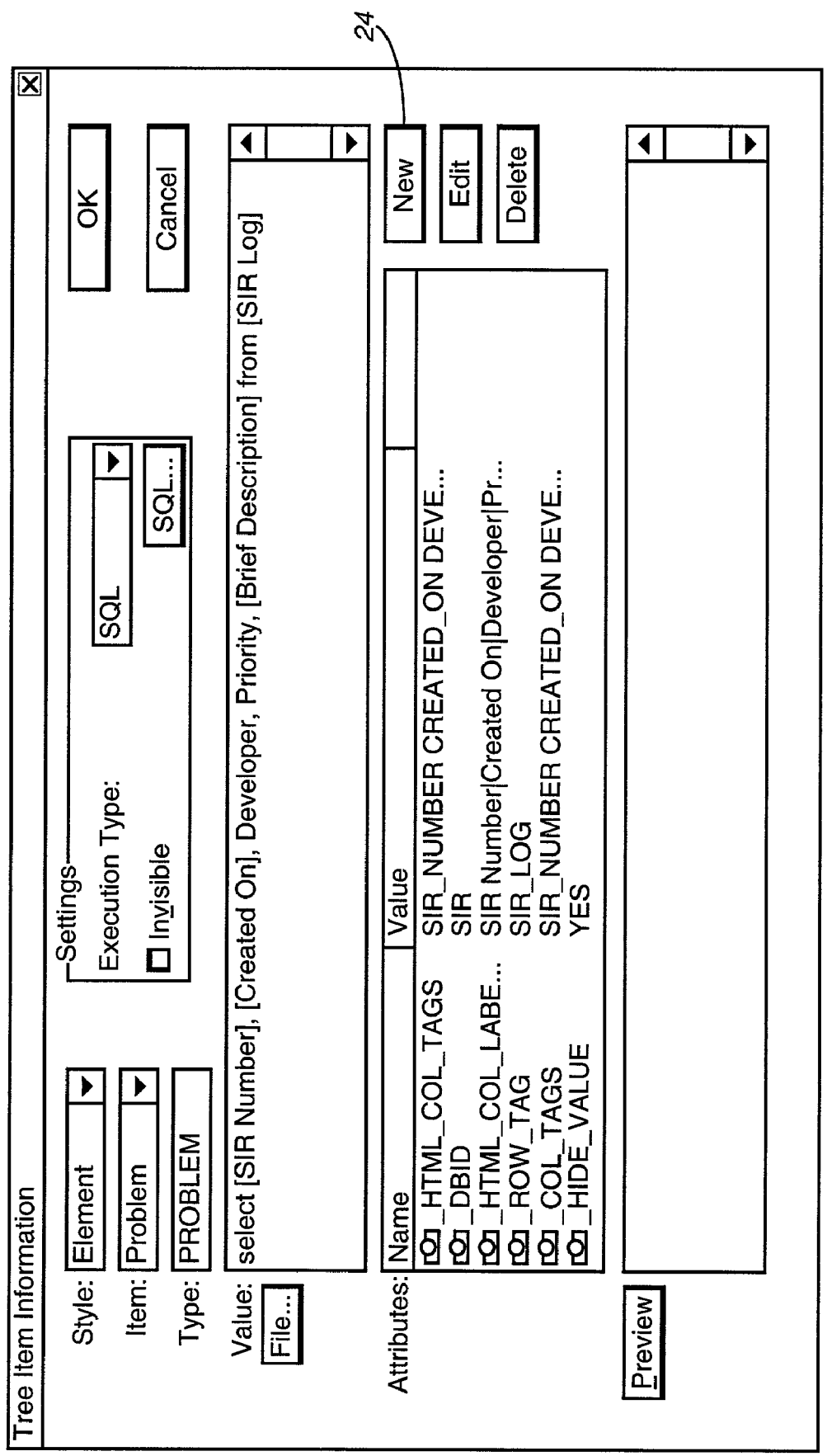
FIG. 4, Preferred Embodiment of Authoring System, presents the graphical computer program layout of an authoring system.
Figure 4D:
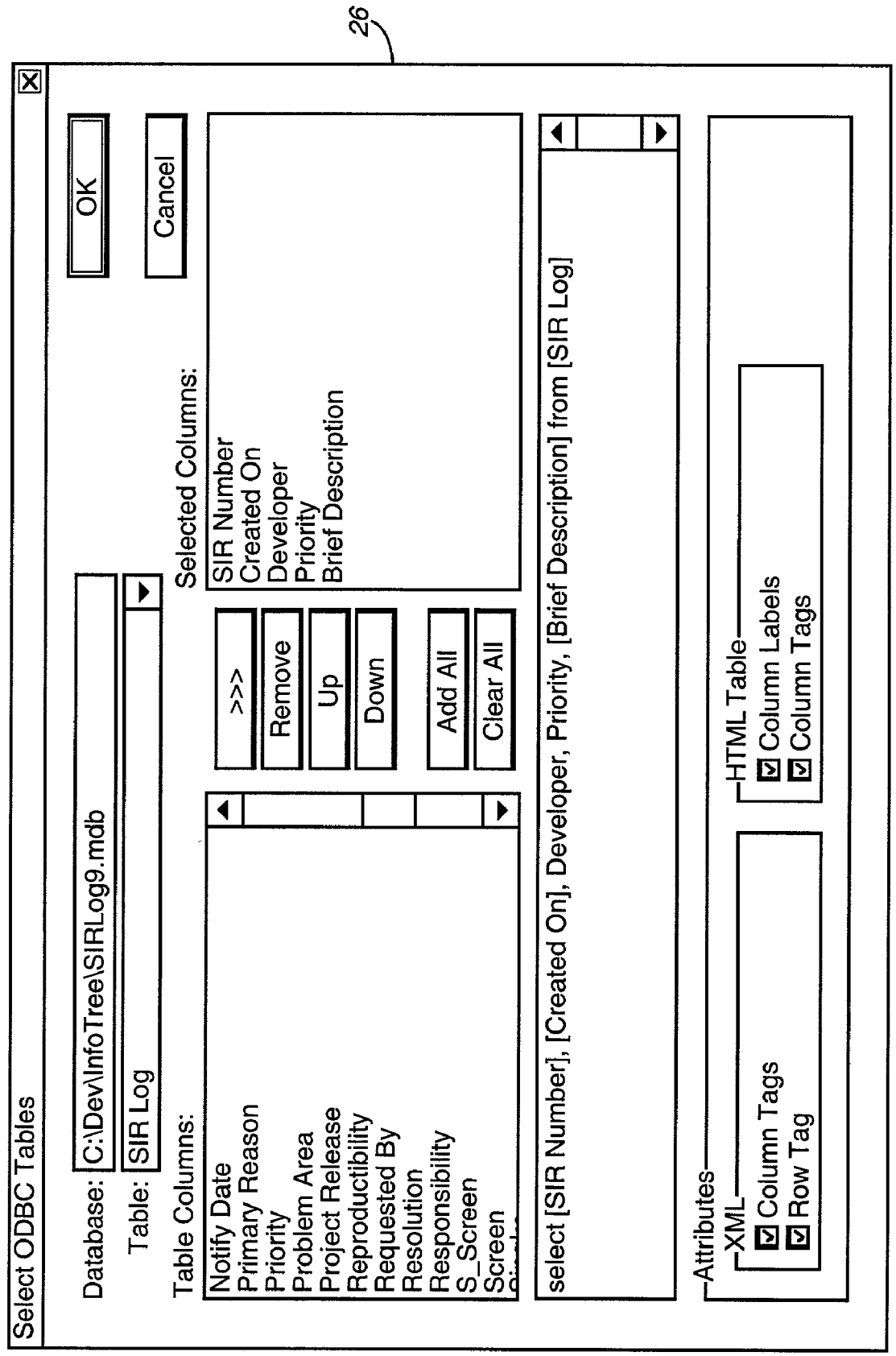

FIG. 4c displays the input form used for creating and editing elements. The Style, Type, Value, and Attributes fields correspond to components of the element as described earlier. The Item field is a synonym (readable label) for the Type, which can be defined in the system parameter file, for example, FIG. 5, lines 202–203. The Settings box displays the Execution Type selection that populates the EXEC attribute, and the Invisible flag, which, when checked, causes the introduction of attribute VISIBLE=NO. The button labeled "File . . . " allows the navigation and selection of a file, whose full path will then be supplied in the Value field. The button labeled "SQL . . . " initiates the display of the helper form in FIG. 4d, which assists in the construction of an SQL statement.

Children of an element are established by creating a new element as a child of an existing element. The user first selects the parent element, then selects a menu option to insert a child element.

FIG. 4a displays an icon next to each element. This icon is associated with the element Type in the system parameter file, as in FIG. 5, line 202. A preferred embodiment also allows the user to specify an icon that is externally generated, in which case the icon's file name would be specified by the attribute FILENAME in FIG. 5, line 202, instead of an internal ICON_INDEX.

A complete set of operations in a preferred embodiment of the invention would include these operations:

XML components may themselves be either static or dynamic, and are treated appropriately before incorporation into the resulting DF.

In another aspect of a preferred embodiment of the invention, one of the Hierarchical Data Server's defined Domains is XML. Consistent with the formatting features mentioned previously, the Data Server can thus dynamically generate XML files on behalf of clients. Clients using the XML domain can exploit the rapidly growing number of software tools designed to work with XML. For example, XML parsers are available free of charge on the World Wide Web, and the W3C Document Object Model, a software component also widely available and built into the Microsoft Internet Explorer version 5.0, enable a Client to navigate through the returned Data File using industry standard software. The ability to use a free parser and free or inexpensive DOM leads to drastically reduced development costs for clients, as the Parsing Code 6 component of an interface no longer needs to be developed.

In another aspect of a preferred embodiment of the invention, the Hierarchical Data Server provides the ability to interface to a plurality of dynamic data source types. As examples, the following dynamic data source types are supported:

1. Open Database Connectivity (ODBC) data sources for any ODBC-compliant data source supporting SQL;
2. Microsoft Data Access Objects and Microsoft JET engine, supporting SQL interfaces;
3. Microsoft ActiveX Data Objects, supporting a multitude of data sources;

| Command | Available when clicked on | Operation |
|---|---|---|
| Insert Root Element | Empty space in left panel | Create a new root level element |
| Edit | Element Icon | Edit the type, value, and attributes of an element |
| Delete | Element Icon | Deletes the selected element |
| Insert Child | Element Icon | Create a child of the selected element |
| Insert Before | Element Icon | Create an element, place it before the selected element. |
| Insert After | Element Icon | Create an element, place it after the selected element. |
| Indent | Element Icon | Move the selected element to make it a child of the element directly above the selected element |
| Outdent | Element Icon | Move the selected element, removing it as a child element and making it a sibling of its previous parent. |
| Drag & Drop | Click and Drag an Element Icon | Repositions the element to a different location in the tree |

XML Support

In another aspect of a preferred embodiment of the invention, both the DDF and the Data File follow the syntax rules of Extensible Markup Language (XML), a standard published by the World Wide Web Consortium. Elements in the XML document representing a DDF can be static or dynamic. When a client requests a document from a server, it references the appropriate DDF that is accessible from the Server, and passes the server any appropriate input parameters. The DDF is copied, parameter substitutions applied, and elements are executed to generate or retrieve the data for each element. Some of these elements may be XML links to other XML documents and/or elements. These external 4. Command line program interface that allows a DDF element to run any program and read and format the result into the Data File.

Each type of dynamic data source is known by an indicator called an EXEC type. The available EXEC types are listed in the system parameter file. When the HDS processes a DDF, each element that specifies an EXEC type as an attribute is executed using the specified EXEC type.

In addition, new dynamic data sources can be defined, and code to implement the interface imported into the Hierarchical Data Server using dynamically loaded code modules. A corresponding EXEC type must be appropriately placed in the system parameter file, and the DDF element data required in the interface must be specified so that the correct information can be passed to the Request Code 4 component. In this way, an enterprise can implement the Request Code 4 and Server Description Code 6 a single time in the Hierarchical Data Server. All clients needing data from a server requiring the new interface would request the data from the Hierarchical Data Server and receive the resulting data in any supported format. Thus, clients in the enterprise use a standard Parser Code 5 component instead of writing new interface code components specific to their interface with the Server in question.

Figure 1:
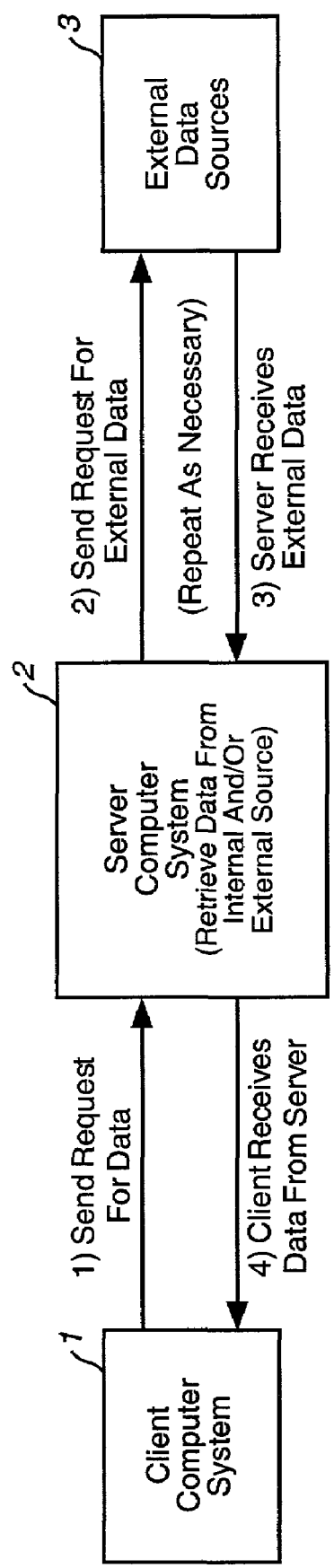
FIG. 1, Typical Client-Server Computer System shows the typical prior-art interactions of communicating computers, especially client-server systems.
Figure 2:
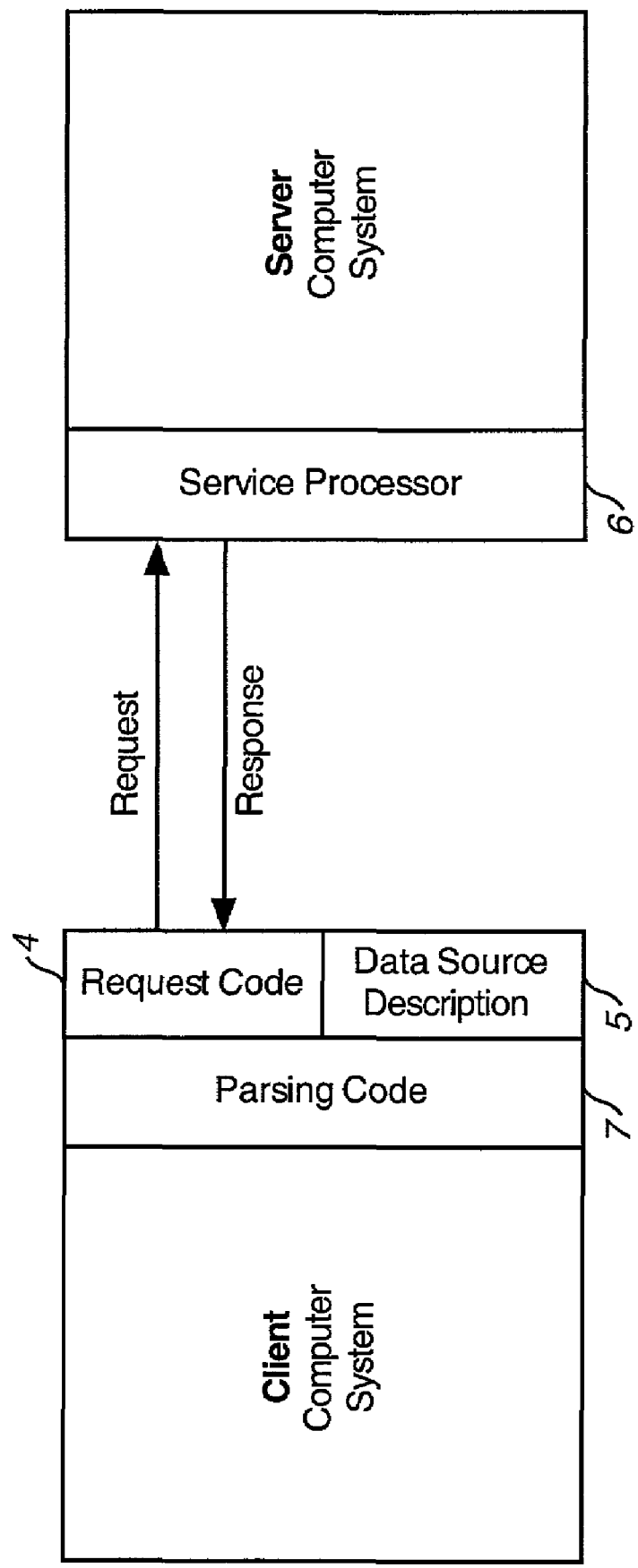
FIG. 2, Client-Server Code Components, shows typical prior-art code components involved in the interfacing of computers.
Figure 3:
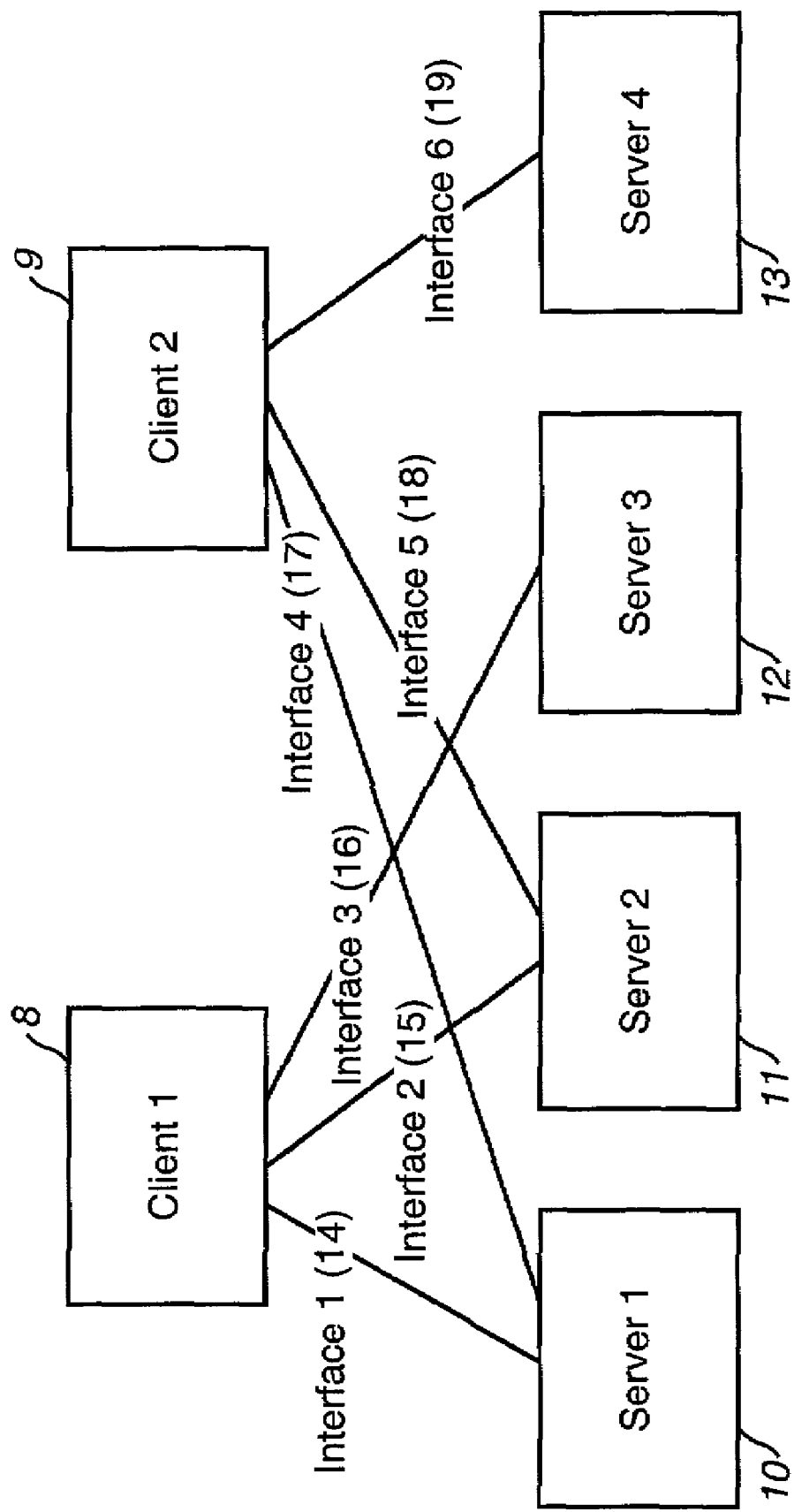
FIG. 3, Multiple Clients and Servers, shows the typical prior-art interactions of multiple Clients interfacing to multiple Servers.

The ability of the Hierarchical Data Server to support new interfaces should not be understated. Revisiting the example of FIG. 3, the Parser Code 5 is now identical for each Client, and the Request Code 4 and Server Description Code 6 is moved to the Hierarchical Data Server and is no longer developed in the Client. Thus, Request Code 4 and Server Description Code 6 is developed once for each Server for a total of 8 components, plus the Parser Code 5 is developed once for both clients for a total of 8 developed components, a dramatic savings over the 22 development components in alternate strategies.

In another aspect of a preferred embodiment of the invention, a Client can request a complex Data File from the Hierarchical Data Server in which a plurality of dynamic elements reference data generated data within the Data File. For example, DDF element A may instruct the HDS to generate a list of rows from a DBMS, which the HDS incorporates as Data File elements. DDF element B may reference the said Data File elements, using selected elements as key parameters in its generation step. Generated data from one DDF element Filtering Data File Output In another aspect of a preferred embodiment of the invention, certain attributes in the DDF element control whether the resulting elements are included in the output Data File. The attribute "INCLUDE", when set to "NO", directs the HDS to exclude the element from the generated Data File. The element is neither executed nor formatted. Generally, the attribute would not be set to the literal "NO" in the DDF. Instead, it would be set to a replacement reference that would be substituted based on a Client-supplied parameter. For example, an input parameter named "DETAIL" might be referenced by an executable element in the DDF by including the attribute "INCLUDE=%% DETAIL". A Client wishing the element to be executed and included would pass the parameter "DETAIL=YES". A Client wishing to exclude the element would pass the parameter "DETAIL=NO".

In addition, the attributes SWITCH and CASE allow clients to select one of a number of elements to execute and include in the output. When the HDS processes an element with attribute CASE, it checks the attribute's value and compares it with the value of the attribute SWITCH in the element's parent. If the values match, the element is executed and included. Otherwise, it is discarded as in the case of attribute "INCLUDE=NO". The value of the SWITCH attribute would likely be a replacement reference, so that a Client could select the desired element to execute by setting an input parameter, similar to the INCLUDE example above.

The VISIBLE attribute controls whether an element is included in the output after execution. A value of VISIBLE=NO directs the HDS to execute the element as normal, yet do not display the resulting element. Children of the element, whether generated via execution or not, are not affected by this attribute.

Multi-Threaded Execution

In another aspect of a preferred embodiment of the invention, the execution of elements is carried out in multiple threads. For an element having executable children, setting an attribute CHILDREN_THREADS=YES directs the HDS to spawn a new thread for each child. Each child executes to completion in the thread. The HDS waits for all children threads to execute prior to finishing processing for the parent.

Joins

In another aspect of a preferred embodiment of the invention, two or more elements can be joined together in the same sense as a database join. When an element specifies the attribute JOIN=YES, or when the predefined element Type is JOIN, the children of the element are joined together. When a Join is specified, children elements in Set/Row/Column format will be joined together into a single set, which replaces this element. Set/Row/Column format is described as follows:

Using the Authoring System, document elements are often generated from database sources. Since databases generally return rows of data, the format of elements are very consistent. A database query returns a set of rows, and each row contains a number of columns. When retrieved into an InfoTree Document, this consistent format is called the Set/Row/Column format. In XML format, an example looks like this:

```
<ORDERS_COMPLETE>
   <ORDER>
      <ORD_CD>0000000026</>
      <SSN>111223333</>
      <SALES_REP>
         <FIRST>Kirstan</>
         <LAST>Vandersluis</>
      </>
   </>
   <ORDER>
      <ORD_CD>0000000044</>
      <SSN>111223333</>
      <SALES_REP>
         <FIRST>Kirstan</>
         <LAST>Vandersluis</>
      </>
   </>
   <ORDER>
      <ORD_CD>0000000045</>
      <SSN>111223333</>
      <SALES_REP>
         <FIRST>Kirstan</>
         <LAST>Vandersluis</>
      </>
   </>
</>
```

The ORDERS_COMPLETE element follows the general structure called Set/Row/Column, which is roughly equivalent to a database table. An InfoTree document can contain many such sets, and in this sense can represent an entire database. InfoTree provides operations on Set elements very similar to SQL commands on database tables. Data from elements with this structure can also be joined (see JOIN_KEY, JOIN_SET, JOIN_LABEL attributes) with each other, or with any other element with a similar structure, namely elements generated from other database tables.

The HDS operations on Set/Row/Column structures allow the HDS to manipulate data from many different system, regardless of the native format of the data. Multiple enterprise data sources can provide data that can then be joined, selected, and filtered in a myriad of ways.

Note that the Set/Row/Column format is not restricted to a single, simple element at the Column level. As in the case of SALES_REP above, a column element may have subelements, and in fact can be arbitrarily complex.

The Join operation references a JOIN_KEY attribute, which specifies the element Type on which to Join. The above example can be joined with another set of element data. For example, assume another element set specifies phone numbers of sales representatives. A portion of the data may look like this:

```
<PHONE_BOOK>
    <REP>
        <SSN>111223333</SSN>
        <PHONE>7195551212</PHONE>
    </REP>
    <REP>
        <SSN>777334444</SSN>
        <PHONE>3035551212</PHONE>
    </REP>
```

Specifying JOIN_KEY=SSN directs the HDS to combine the sets into a single set, resulting in the PHONE element being copied into the ORDER set as follows:

```
<ORDERS_COMPLETE>
  <ORDER>
    <ORD_CD>0000000026</>
    <SSN>111223333</>
    <PHONE>7195551212</PHONE>
    <SALES_REP>
        <FIRST>Kirstan</>
        <LAST>Vandersluis</>
    </>
  </>
  <ORDER>
    <ORD_CD>0000000044</>
    <SSN>111223333</>
    <PHONE>7195551212</PHONE>
    <SALES_REP>
        <FIRST>Kirstan</>
        <LAST>Vandersluis</>
    </>
  </>
  <ORDER>
    <ORD_CD>0000000045</>
    <SSN>111223333</>
    <PHONE>7195551212</PHONE>
    <SALES_REP>
        <FIRST>Kirstan</>
        <LAST>Vandersluis</>
    </>
  </>
</>
```

The Join operation can be performed on any number of children. For a more detailed specification of the Join Specification, see FIG. 13, Join Code.

Element Attributes

Many processing commands are controlled by element attributes. The form for an attribute is:

ATTRIBUTE=VALUE

Where ATTRIBUTE is the name of the attribute from the table below, and VALUE is a string value enclosed in single or double quotes.

A list of supported attributes follows:

| Attribute | Description |
| --- | --- |
| EXEC | If present, this element is dynamic. This attribute designates the execution type (SQL, ActiveX, Join, Shell, ADO). SQL takes an SQL statement from the Value field and executes it. The target data source of the SQL statement must be specified by a DBDEFINITION element somewhere in the document. The default DBDEFINITION is the first instance in the sequence of parent elements, or any sibling element of a parent. Alternatively, the DBNAME attribute specifies the ID of DBDEFINITON element. ActiveX invokes an ActiveX control to generate data. Join performs a database Join on the children elements. Command executes a shell command to generate data. Shell takes a shell command as the value, executes it using its stdout as data. |
| JOIN_LABEL | Designates the Type tag to use for resulting element sets from a Join |
| JOIN_TYPE | Performs either an Inner or Outer join on the children elements |
| ROW_TAG | The Type tag to use in generated row data for SQL rows or lines of data generated by a Shell Command. |
| COL_TAG | The Type tag to use in generated column data for SQL columns, or token data generated from a Shell Command. |
| COL_TAGS | A list of Type Tags to be used to tag columns returned from an SQL statement or for tokens generated by a Shell Command. |
| JOIN_KEY | The Type tag to look for which defines the element sets to join. When the Value field of the appropriately tagged subelements are equal, the elements are joined to form a single element in the result set |

| Attribute | Description |
|---|---|
| VISIBLE | Determines whether the element is visible in the resulting document (default is "YES"). If this is "CONTENT_ONLY", the value of the element is transferred to the resulting document, but not the attributes or element type data. |
| COL_SEPARATOR | For SQL elements, designates a separator character between columns. If this attribute is present, the columns do not have their own start and end tags. The column data is instead separated by this character. For shell-generated elements, this character string designates the separation between tokens, each of which will become elements. If this is " " (single space), then parsing removes excess white space between tokens. |
| DBTYPE | Type of the database: ODBC, DAO (Data Access Objects), ADO (Active Data Objects), XML (Extensible Markup Language), ITD (InfoTree DDF) |
| DBNAME | Reference to an element that defines the data source. This is the ID of the DBDEFINITON element defining the data source. |
| HTML_COL_TAGS | Specifies the tags to generate column headings in an HTML generated table. |
| COL_LABELS | List of labels, separated by 'l', designating the column header for the HTML table. |
| SORT_BY | Designates sorting criteria for a Set/Row/Column formatted element. Lists the column tag and optionally whether the sort is ascending (ASC) or decending (DEC). Example: SORT_BY = "ORDER_CD ASC". Multiple sort criteria can be applied in order of significance, by including more than one SORT_BY attribute. |
| CHILDREN_THREAD | Designates whether children of this element are expanded in parallel. |
| SKIP | Designates whether this element is skipped. If "YES", this element is not expanded, and is treated as invisible. The resulting InfoTree document behaves as though this element does not exist. |
| SWITCH | Controls the generation of children elements. The value of the SWITCH attribute selects the children elements which are executed. Any child element with a CASE attribute equal to the value of the SWITCH element will be expanded. All others will be skipped, as if the SKIP attribute is set to YES. |
| CASE | Controls the generation of children elements. |
| IMPORT | Specifies the URL of a file to import into this element. This element is replaced by the root designated by the value of this attribute, which may contain an element reference (separated by #). |
| IMPORT_TYPE | Specifies the type of resource to import. Values are XML or ITD |
| PARSE | For Shell command elements, determines whether the command output is parsed (the default) according to ROW_TAG (per output line), COL_TAG or COL_TAGS (per "column"). If set to "NO", the output of the shell command is used as the text for the element. If set to "XML", the internal XML parser is run with the output of the shell command, and the output is parsed into DDF format. |
| HIDE_VALUE | This attribute indicates that the generated output element will not include the element's value. |

A preferred embodiment of the invention recognizes several special elements Types. These elements, when processed, cause useful effects as described below.

| Element Item | Element Type | Description |
|---|---|---|
| Database | DBDEFINITION | Defines a Data Source to be used in SQL executions |
| Input | INPUT | Defines a list of parameters for the document. A document generally has at most one element of this type. A client requests a document by specifying the DDF and a replacement INPUT element. The supplied INPUT element is used to replace variables in the document. |

-continued

| Element Item | Element Type | Description |
| --- | --- | --- |
| Join Children | DBJOIN | Specifies that children elements in Set/Row/Column format will be joined together into a single set, which replaces this element. |
| General | GENERAL | A generic element type that can be used to house any static or dynamic attributes, values, and children. |

OPERATION OF INVENTION

Figure 6:
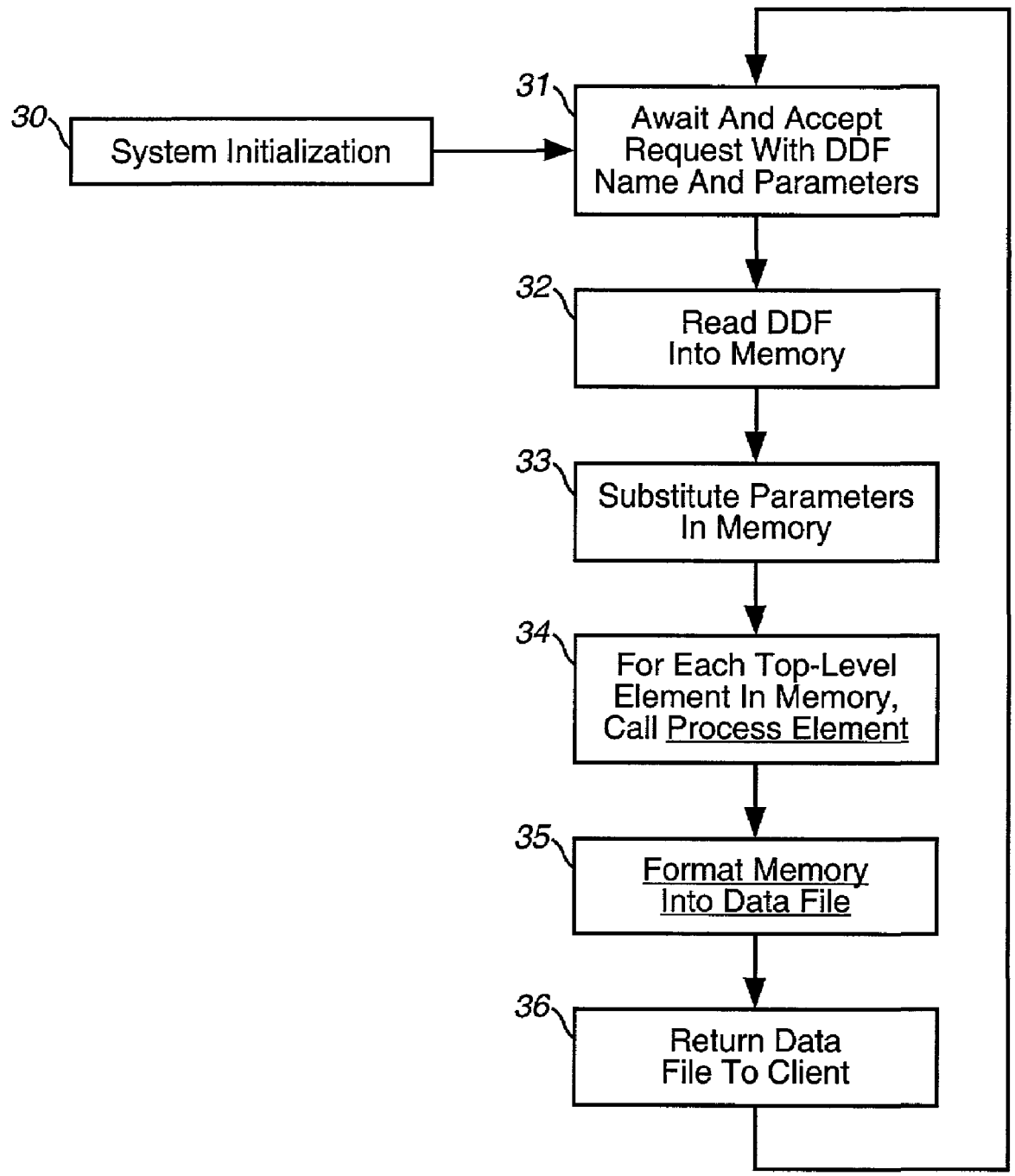
FIG. 6, Hierarchical Data Server Process, is a flowchart describing the processing steps of the preferred embodiment.
Figure 14:
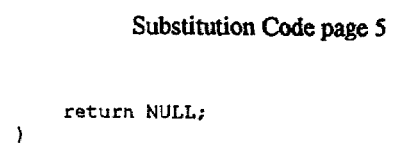

FIG. 6 shows a flowchart of the HDS portion of the preferred embodiment of the present invention. The HDS begins execution as a computer program by performing a System Initialization step 30 in which the program is loaded and initialized. During this step, the System Parameter file, FIG. 5, is read into memory for use during execution of the HDS. The HDS then awaits and accepts requests 31 from Clients. Communication between Client and Server can occur using any available mechanism, for example HTTP. Requests include a name to uniquely identify the DDF, plus a plurality of parameters appropriate for the DDF, each set according to the needs of the Client. Once the full request is received, the HDS reads the full DDF into memory 32, and performs parameter substitution in memory 33. Each parameter includes a reference to an element component in the DDF, plus a value to replace in the form <reference>=<value>. Parameter substitution is performed in part by using the mechanisms of FIG. 14, Substitution Code. For each parameter, the reference is passed to GetTreeItemComplexPath 410, which returns a pointer to the appropriate element in the DDF. Note that an element is coded as a CTreeItem in the code examples. The pointer, now pointing to the desired element, provides access to the element. If the <reference> includes an attribute name, the attribute with that name in the element in question gets the <value> passed in. If no attribute name is part of the <reference>, the <value> is copied into the Value for the element in question. This process is repeated for each parameter.

After parameter substitution, each top-level element in the DDF is processed 34 by a method to be described presently. Recall that a DDF is defined as a list of elements. The current process 34 simply calls the method Process Element 37, FIG. 7, on each element in this list. Once processing is complete, the resulting data is formatted into a data file 35, using a process fully described in FIG. 9. Finally, the resulting Data File is returned to the Client.

Figure 7:
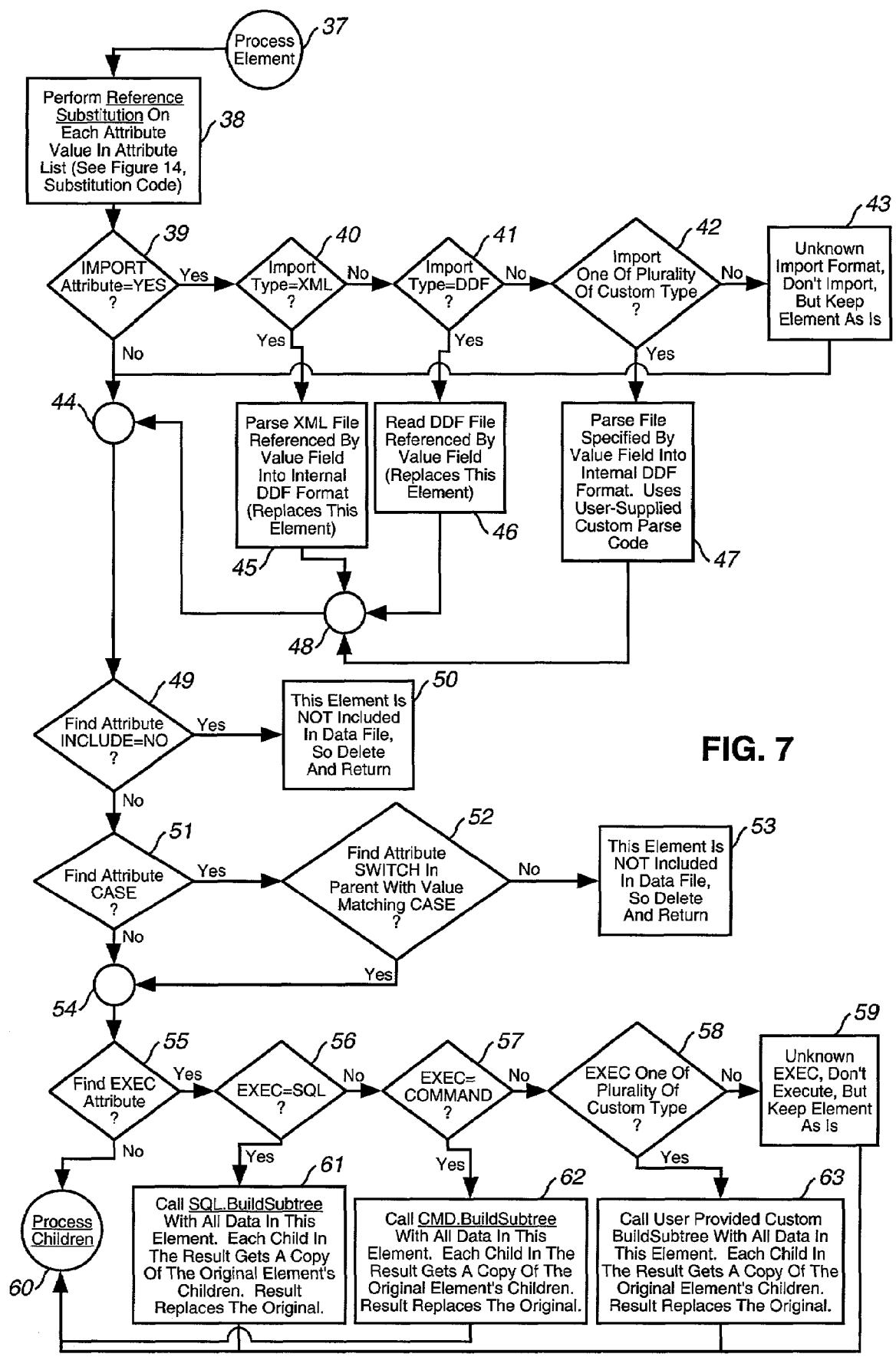
FIG. 7, Process Element, is a flowchart describing the processing steps taken by the HDS to process an element.

FIG. 7, Process Elements, describes the method of processing an element 37. First, Reference Substitution is performed 38 by the mechanism described in FIG. 14, Substitution Code. We then check for an IMPORT attribute in the element 39, and if so, we check the value of the Import Type attribute to see if it is XML 40, DDF 41, or some other supported custom type 42. As can be seen in FIG. 7, the element is processed appropriately 45, 46, 47 based on the value of this attribute. If the value indicates an unknown format, we don't import, but instead keep the element as is.

We next perform conditional inclusion processing the INCLUDE, SWITCH, and CASE attributes at items 49, 50, 51, 52, and 53. Next, we determine if this element is executable 55 based on the value of the EXEC attribute, in which case we execute it appropriately as described by 56, 57, 58, 59, 61, 62, 63. If the value of the EXEC attribute is SQL 56, we execute the element in the method described by FIG. 11, SQL BuildSubtree, which builds and returns an element hierarchy that then replaces the current element. If the value of the EXEC attribute is COMMAND, we execute the element in the method described by FIG. 13, CMD BuildSubtree, which builds and returns an element hierarchy that then replaces the current element. This method can be extended by integrating other execution types 58 and 63. After execution of the element and replacement with the new element hierarchy, children of the original element are copied to each child of the new hierarchy. The copied children may be executable elements, and can reference the newly generated elements, as long as they have foreknowledge of the element names and structure. Finally, each child of the element, whether it was executed as just described, or not 60, is itself processed using the method of FIG. 8, Process Children.

Figure 8:
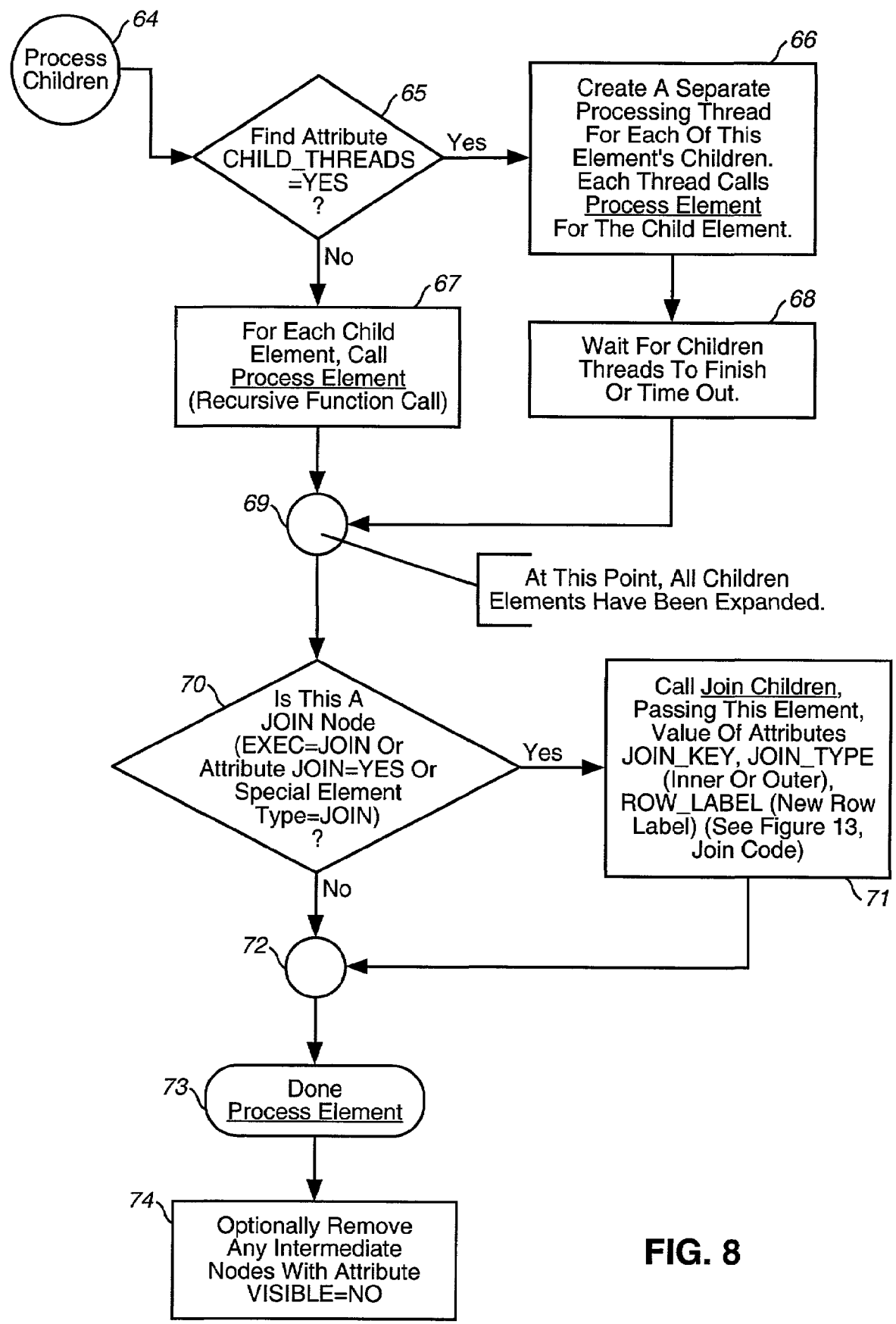
FIG. 8, Process Children, is a flowchart describing the processing steps taken by the HDS to process the children element of an element.

FIG. 8, Process Children, begins by checking whether the children are to be processed by parallel threads 65. If so, a new processing thread is created for each 66. Within the thread, Process Element 37 is called for the child element. Once all threads are running, the thread processing the parent element blocks 68, waiting for all threads to terminate, or until a timeout expires, at which point all child threads are done and we proceed with processing.

If children threads are not requested 65, we sequentially call Process Element 37 for each child. Note that for both the multi-threaded and single-threaded cases, we are recursively calling Process Element 37, thus systematically processing our way through the element hierarchy in a depth-first sequence. After all elements are processed 69, we perform post-processing operations. In particular, we check for a Join request 70, and if requested, we join the plurality of children as described in 71. At this point we are done processing an element, and we may optionally remove all elements that have an attribute VISIBLE=NO. If we choose not to remove these elements here, we remove them later in the formatting procedure of FIG. 9.

Figure 9:
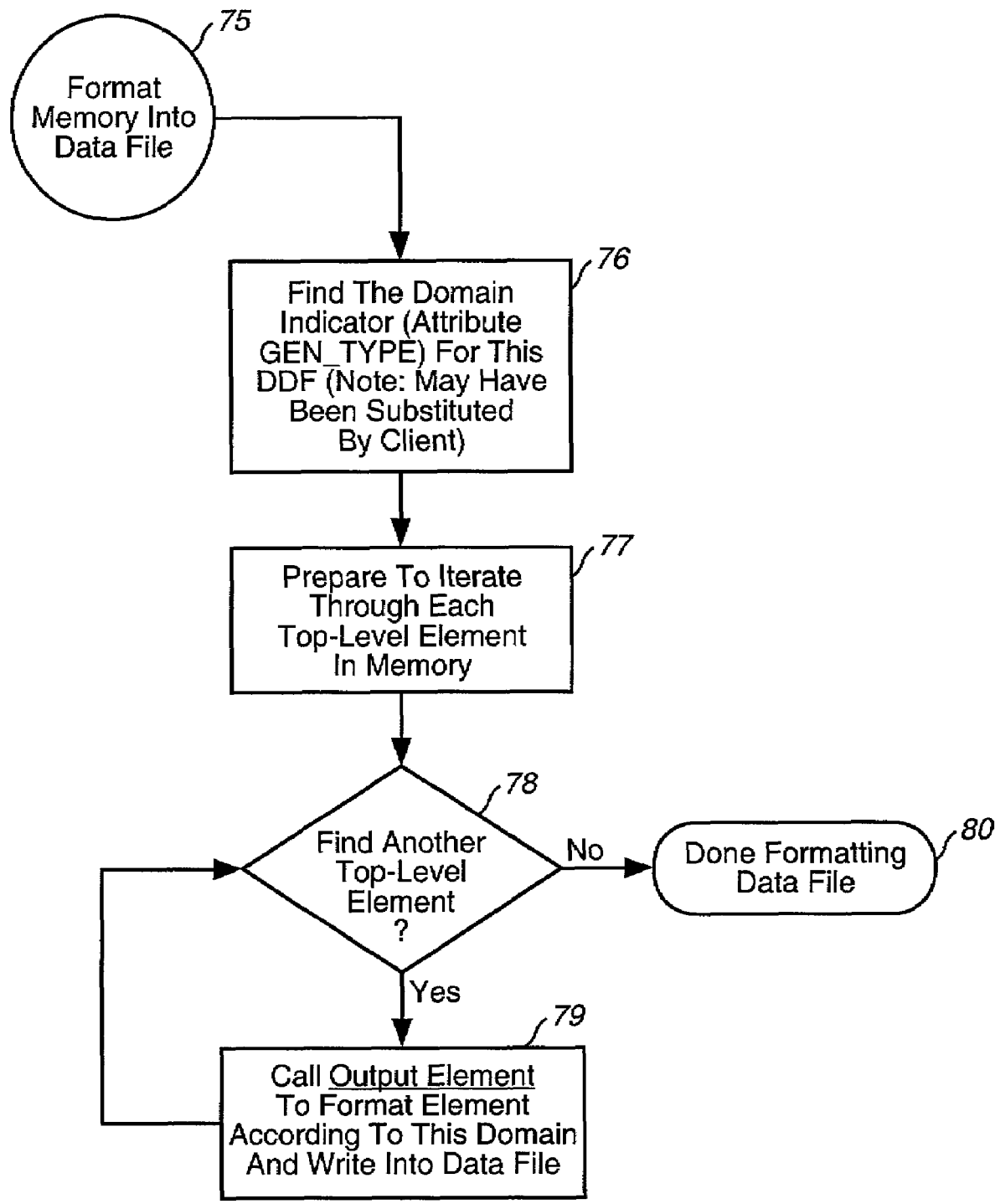
FIG. 9, Format Memory into Data File, is a flowchart describing the processing steps taken by the HDS to format DDF elements after they have been executed.

FIG. 9, Format Memory into Data File, first establishes the Domain of the format 76. Note that the Client may have specified the format in a parameter. We next prepare to iterate through the list of top-level elements 77, and for each top—top level element we find 78, call Output Element 79, whose method is described in FIG. 10. If no elements remain, we are done formatting 80.

Figure 10:
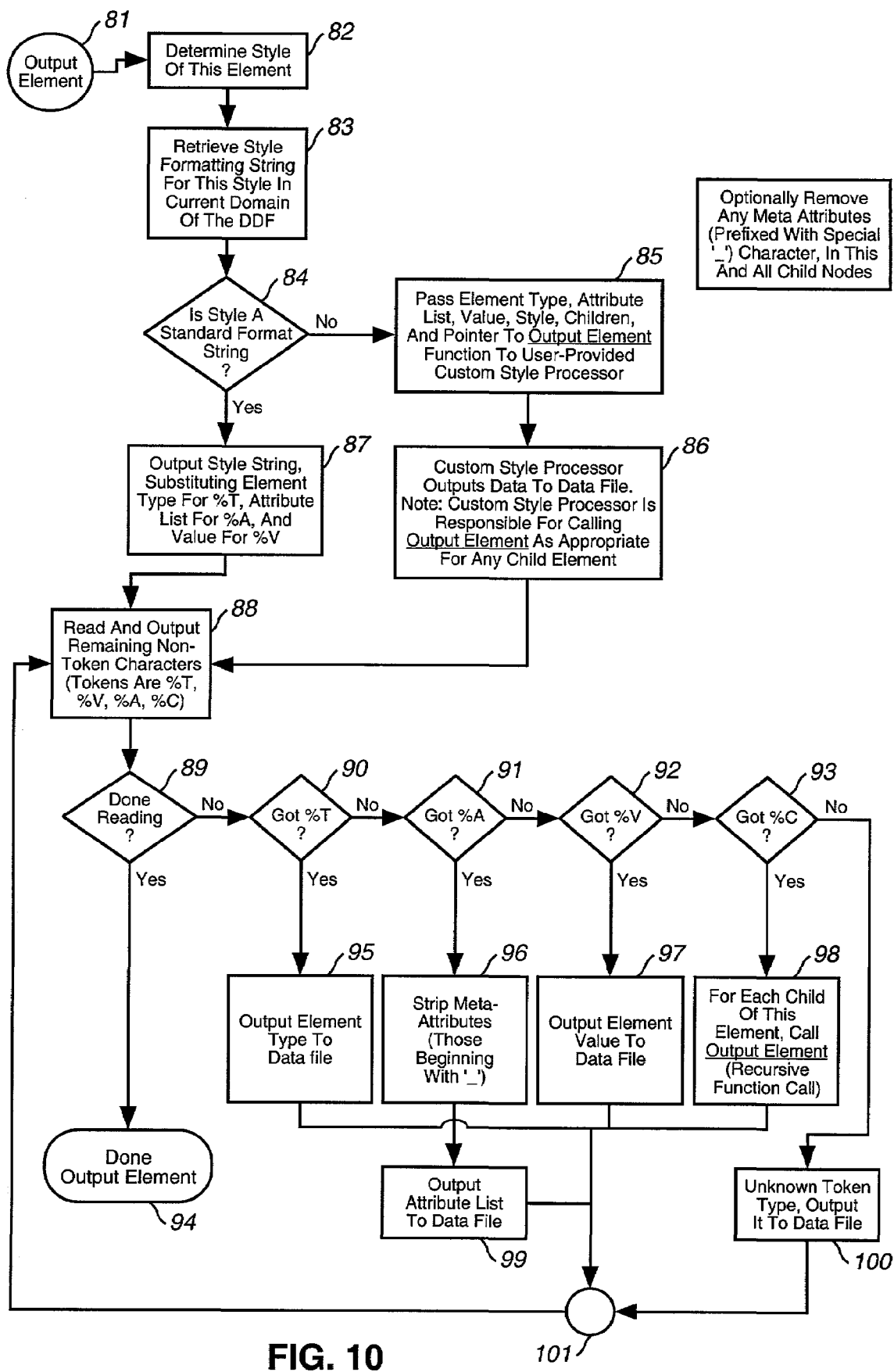
FIG. 10, Output Element, is a flowchart describing the processing steps taken by the HDS to format and output an element.

FIG. 10, Output Element, provides the mechanism to format and output the element to the Data File. We begin by determining the Style of the element based on the element's Style indicator and the current Domain. FIG. 5, System Parameter File, shows the format of example Domains and Styles. For example, Line 4 begins the Domain XML, which we will match if the current DDF's GEN_TYPE also is XML. The current element may have a Style of "ELEM", which we will match against the Style of Line 5. Line 6 provides a formatting string. The formatting string is output to the Data File, with special tokens indicated by '%' being replaced by components of the elements. The following substitutions are performed: % T is replaced with the element Type, % V is replaced with the element Value, % A is replaced with the element's attribute list, each attribute constituting a key-value pair, and % C is replaced by the output of the children of this node. Note that here again, we recursively define a mechanism that will process and format elements in a depth-first fashion. In the current example, our format string is "<% T % A>% V % C<?% T>". If our element Type is "ITEM", and we have one attribute NUM=1, and the element Value is "TABLE", the output would be "<ITEM NUM=1>TABLE</ITEM>". FIG. 10 describes this substitution in 84, 87, 88, 89, 90, 91, 92, 93, 95, 96, 97, 98, 99, and 100. Custom formats may also be processed as in 85 and 86. Elements that have attribute VISIBLE=NO are not output, but if % C is specified in the format string, the children elements are processed here as usual.

Figure 11:
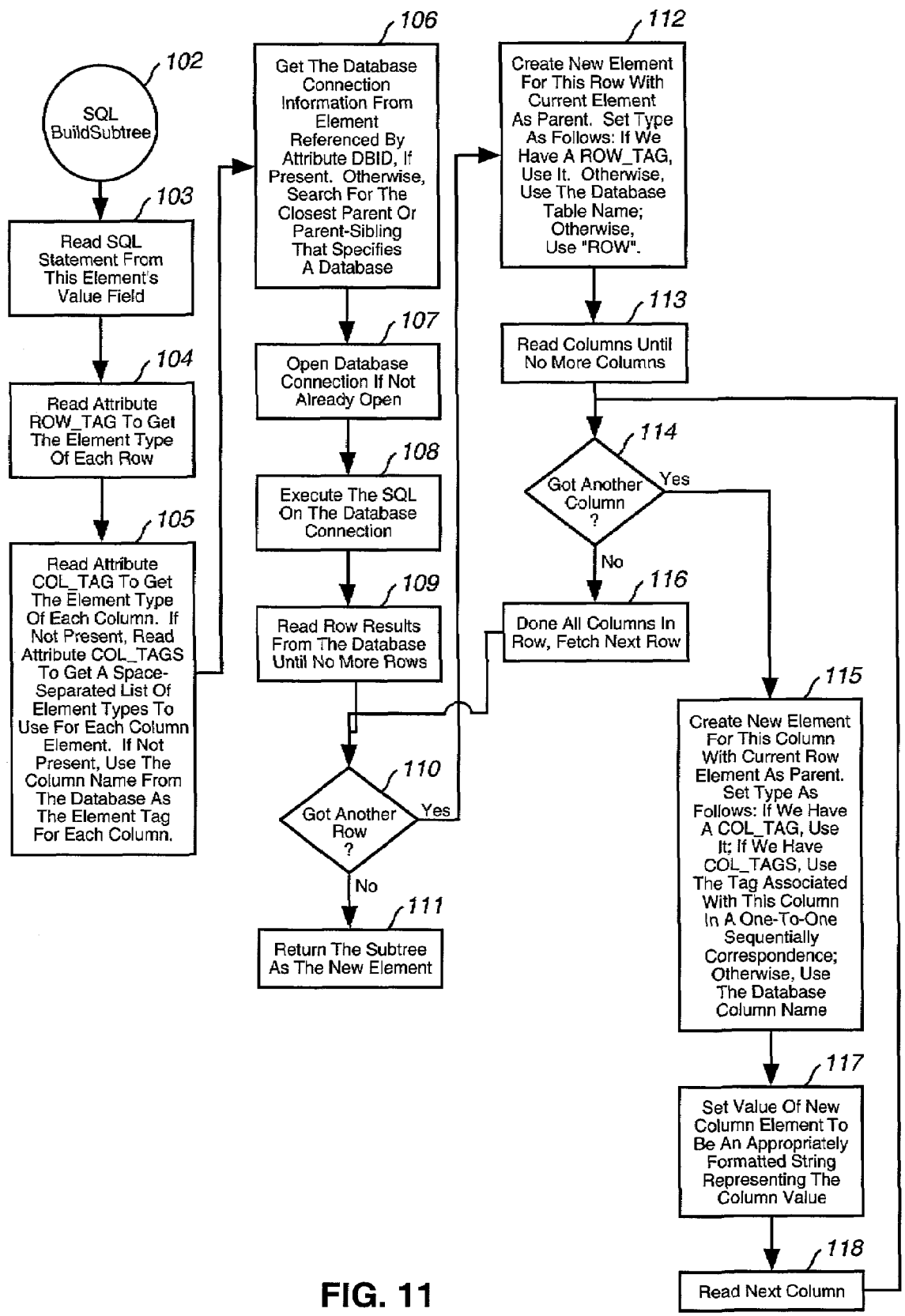
FIG. 11, SQL BuildSubtree, is a flowchart describing the processing steps taken by the HDS to execute an element containing an SQL statement, thereby dynamically generating data for the element.

FIG. 11, SQL BuildSubtree presents the mechanism for executing an element that has execution type EXEC=SQL. The SQL statement is taken from the element's Value field 103. We then determine how to format the resulting rows 104 and columns 105 in terms of element components. This means we need to determine the Type of the generated elements. Next, we secure the database connection 106 and open the connection 107 if it is not open already. Then we execute the SQL on the connection 108 and begin reading database rows 109. When we get a row 110, we create a new element as described in 106, then process the columns in the row 113 until there are no more. For each column 114, we create a new element, giving the element the Type as described by 115 and the value of the database column 117. We process all columns in the row in this manner until no more columns are available, then move to the next row 116. We process all rows as described above until no more are available, then we return the newly created element hierarchy or subtree 111.

Figure 12:
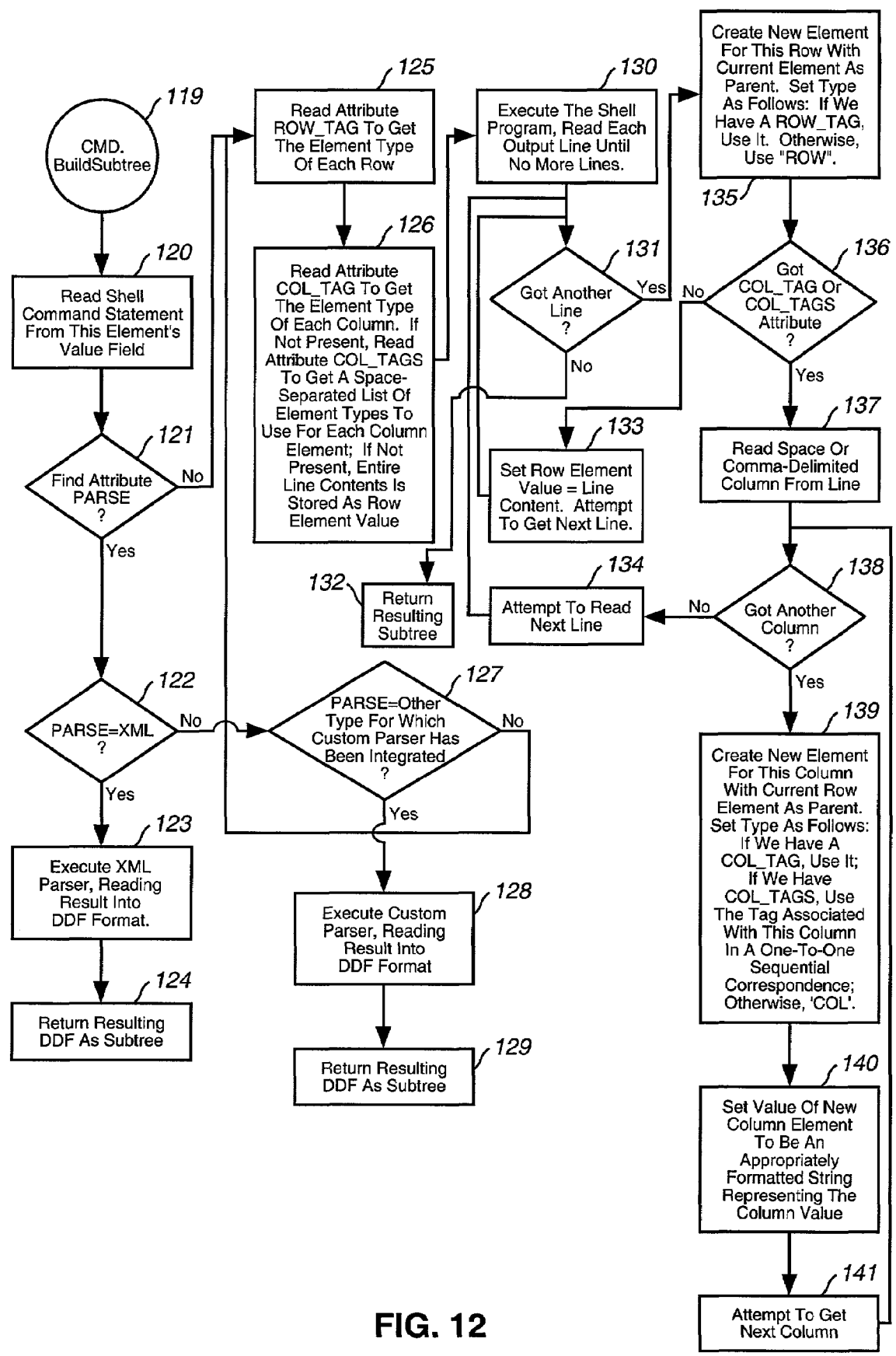
FIG. 12, CMD BuildSubtree, is a flowchart describing the processing steps taken by the HDS to execute an element containing a shell command, thereby dynamically generating data for the element.
Figure 15:
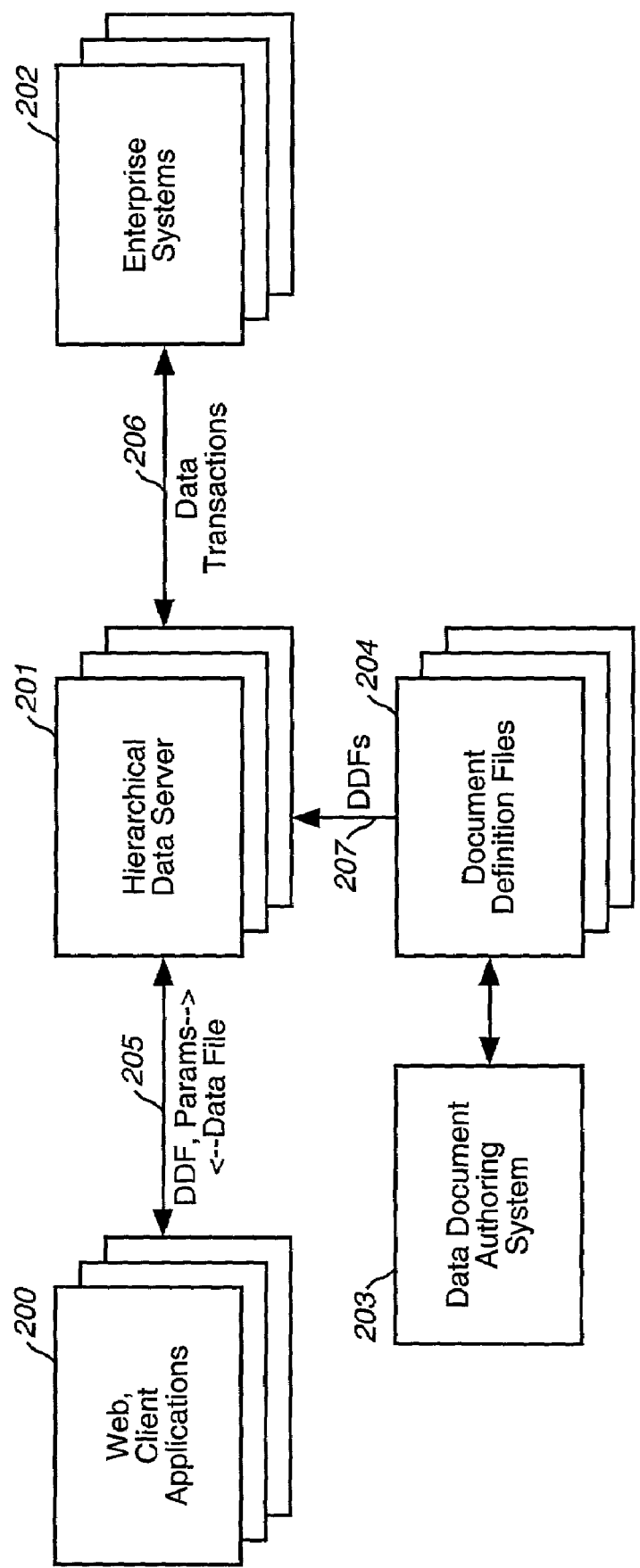
FIG. 15, Overview of a Hierarchical Data Server and DDF Authoring System, is a block diagram depicting a portion of a network of computers suitable for practicing the preferred embodiment of the present invention.

FIG. 12, CMD BuildSubtree presents the mechanism for executing a command line program and formatting the results into an element hierarchy. We retrieve the command line program (also called shell program) from the element's Value field. We next check for the attribute PARSE 121, and if present, check if its value is XML 122. In this case, we run the command line program, and feed its output into an XML parser 123, reading the resulting data into DDF format and returning it 124. If the value of the PARSE attribute is something else, we check to see if this is a request to run a custom parser (such as an SGML parser, or any other custom parser) 127, then we run the command line program and feed its output into the custom parser, which reads the resulting data into DDF format 128, which we return 129.

If we did not find the PARSE attribute, we proceed with processing the element. We read the formatting commands as described in 125 and 126, which directs us how to create elements, and what the element Types will be. We then execute the command line program 130, and then read lines of data 131 as long as we can get another line. For each line we read, we create a new element as specified in 135, then we determine if we need to create column level elements based on the presence of the COL_TAGS or COL_TAG attributes 136. If not present, we set the new row elements Value to the value of the read line 133, then attempt to get the next line. If COL_TAGS or COL_TAG is present, we parse the line as space or comma delimited columns, creating an element for each as specified in 138, 139, 140, and 141.

While the above descriptions contains many specificities, these should not be construed as limitations on the scope of the invention, but rather as an exemplification of one preferred embodiment thereof. Many other variations are possible.

Accordingly, the scope of the invention should be determined not by the embodiment illustrated, but by the appended claims and their legal equivalents.

What is claimed is:

1. A system for converting data from one or more systems into a hierarchical data scheme, comprising:
    a) a user-defined document definition file, which is identified by a unique name and defines a list of parameters, and is a hierarchically organized set of elements, each element comprising an element type, a text value, a list of attributes and a list of child elements; and
    b) a module that accepts a request from a requesting system, the request including the unique name of a document definition file and a parameter name with corresponding value; upon receiving the request, the module reads the document definition file, visits each element and replaces a reference to a parameter, element or attribute with an actual value; and returns a data file to the requesting system.

2. The system of claim 1 wherein a format of the document definition file may be an Extensible Markup Language, (XML), a Standard Generalized Markup Language (SGML), or their variants.

3. The system of claim 2, wherein the element contains a command.

4. The system of claim 3, wherein the command includes a substitutable parameter.

5. The system of claim 4, further including a graphical tree based environment.

6. The system of claim 5, wherein the graphical tree based environment executes a portion of the document definition file.

7. The system of claim 6 wherein the element specifies an operation executed by a software program.

8. The system of claim 7 wherein the reference is replaced by a value prior to the execution of any operation.

9. The system of claim 8 wherein the operation changes a hierarchy of the document definition file.

10. The system of claim 9, wherein the operation is conditional.

11. The system of claim 9 further including a display module capable of displaying the data file.

12. The system of claim 11 wherein an element defines a join operation.

13. The system of claim 12 wherein the conditional operation determines a path of execution through the document definition file.

* * * * *